United States Patent
Haronian et al.

(10) Patent No.: US 11,203,235 B2
(45) Date of Patent: Dec. 21, 2021

(54) SYSTEM FOR TIRES PRESSURE AND WEAR DETECTION

(71) Applicants: Dan Haronian, Efrat (IL); Michael Haronian, Efrat (IL); Hemi Sagi, Carmel, IN (US)

(72) Inventors: Dan Haronian, Efrat (IL); Michael Haronian, Efrat (IL); Hemi Sagi, Carmel, IN (US)

(73) Assignee: Enervibe Ltd, Hevel Eilot Regional Council (IL)

( * ) Notice: Subject to any disclaimer, the term of this patent is extended or adjusted under 35 U.S.C. 154(b) by 56 days.

(21) Appl. No.: 16/917,902

(22) Filed: Jul. 1, 2020

(65) Prior Publication Data

US 2021/0347215 A1 Nov. 11, 2021

Related U.S. Application Data

(63) Continuation-in-part of application No. 16/866,581, filed on May 5, 2020, now abandoned.

(51) Int. Cl.
*B60C 23/00* (2006.01)
*B60C 23/04* (2006.01)
(Continued)

(52) U.S. Cl.
CPC ...... *B60C 23/0411* (2013.01); *B60C 23/0474* (2013.01); *B60C 23/0486* (2013.01);
(Continued)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/20; B60C 23/0444; B60C 23/0462; B60C 11/24; B60C 23/064; B60C 23/007; B60C 23/0479;
(Continued)

(56) References Cited

U.S. PATENT DOCUMENTS 10,675,925 B1 * 6/2020 Oakes, III ........... B60C 23/0486
2005/0199328 A1 * 9/2005 Schoenberger ..... B60C 23/0408
152/415

(Continued)

FOREIGN PATENT DOCUMENTS

CN 106274310 A * 1/2017 ......... B60C 23/0494
JP WO2021153278 A1 * 1/2021 ............. B60C 11/24
(Continued)

*Primary Examiner* — Andre J Allen

(57) ABSTRACT

A system for detecting pressure and wear conditions of tires that includes a module positioned inside each wheel of a vehicle. The module includes sensors, a processor, a transmitter and a power source for powering the module. The output from the sensors in each wheel is fed to the processors of each wheel for data processing and the data is transmitted by the transmitter in each wheel to a receiver and data processor located outside of the wheels. The data processor is designed to analyze the received processed data from the modules, and to provide alerts based on stored information and by comparing the processed data from the first wheel with the processed data from the second wheel.

23 Claims, 23 Drawing Sheets

(51) Int. Cl.
*G01L 17/00* (2006.01)
*H02N 2/18* (2006.01)
*H02K 7/18* (2006.01)
*H02J 7/34* (2006.01)
*H02J 50/00* (2016.01)

(52) U.S. Cl.
CPC .............. *G01L 17/00* (2013.01); *H02J 7/345* (2013.01); *H02J 50/001* (2020.01); *H02K 7/1846* (2013.01); *H02K 7/1853* (2013.01); *H02N 2/186* (2013.01)

(58) Field of Classification Search
CPC .............. B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/00363; B60C 23/0483; B60C 11/0318; B60C 23/0459; B60C 23/0471; B60C 23/0481; B60C 23/042; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/065; B60C 23/00336; B60C 23/0484; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0418; B60C 23/0457; B60C 23/12; B60C 25/18; B60C 11/13; B60C 23/0469; B60C 23/04985; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .................................................. 73/146–146.8
See application file for complete search history.

(56) References Cited

U.S. PATENT DOCUMENTS

| | | | |
|---|---|---|---|
| 2006/0243043 A1 * | 11/2006 | Breed | B60C 23/041 |
| | | | 73/146 |
| 2010/0238007 A1 * | 9/2010 | Kikuchi | B60C 23/04 |
| | | | 340/438 |
| 2014/0107946 A1 * | 4/2014 | Kandler | B60C 11/246 |
| | | | 702/34 |
| 2021/0181064 A1 * | 6/2021 | Kelly | B60C 11/246 |

FOREIGN PATENT DOCUMENTS

| | | | | |
|---|---|---|---|---|
| JP | WO2021153277 A1 * | 5/2021 | ............. | B60C 11/24 |
| WO | WO02092364 A2 * | 11/2002 | ............ | B60C 23/064 |
| WO | WO-2009070063 A1 * | 6/2009 | ......... | B60C 23/0474 |
| WO | WO2021165291 A1 * | 8/2021 | ............. | B60C 11/24 |

* cited by examiner

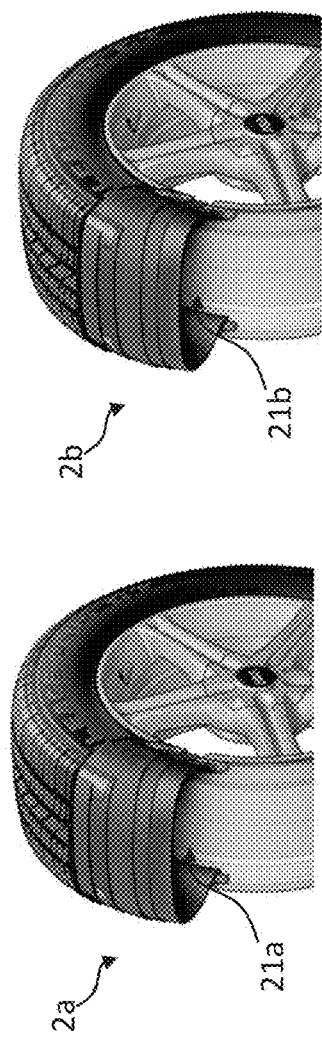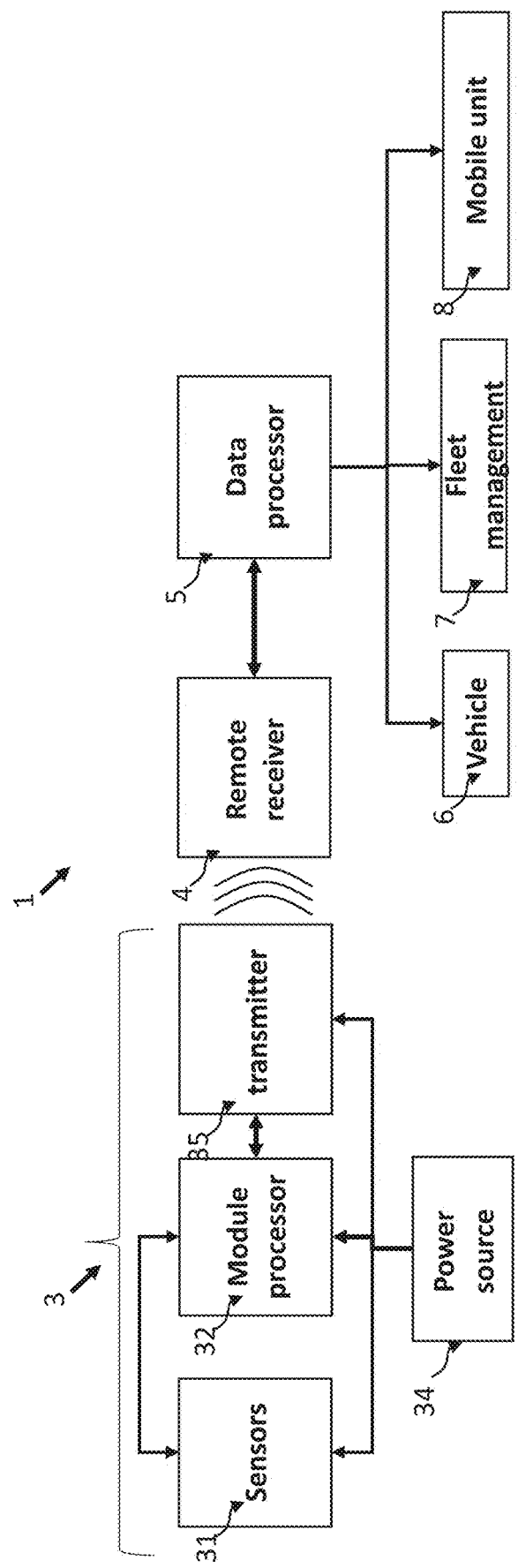
FIG. 1

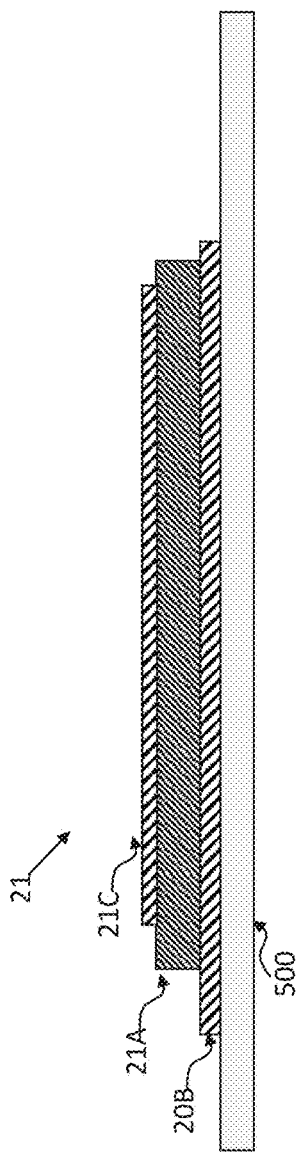
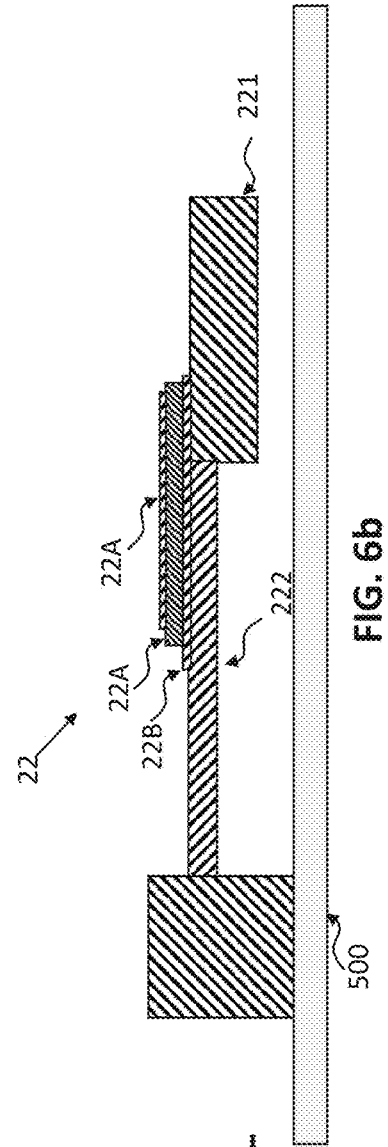
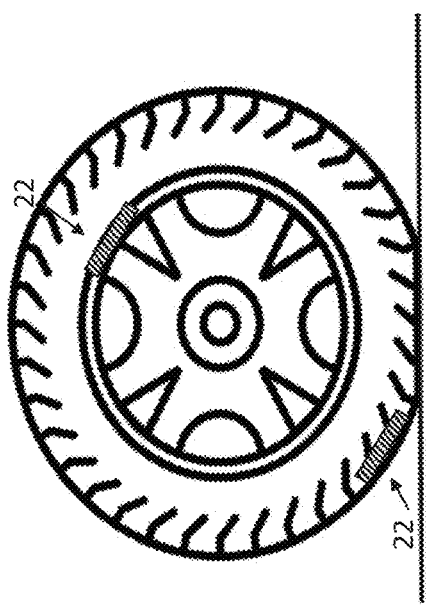
FIG. 6a
FIG. 6b
FIG. 6c

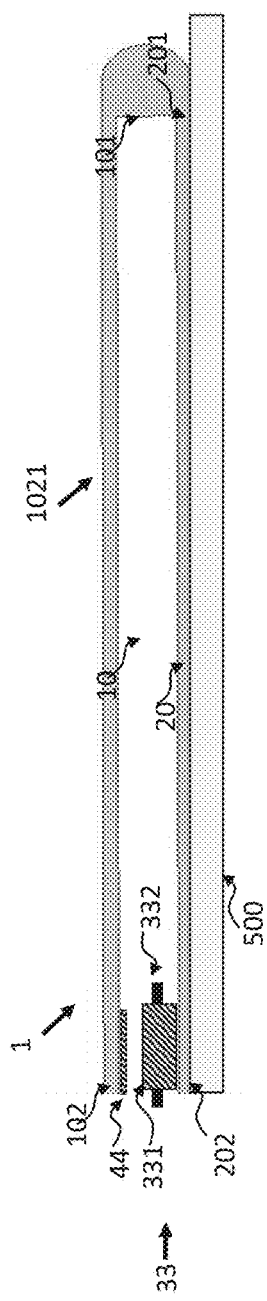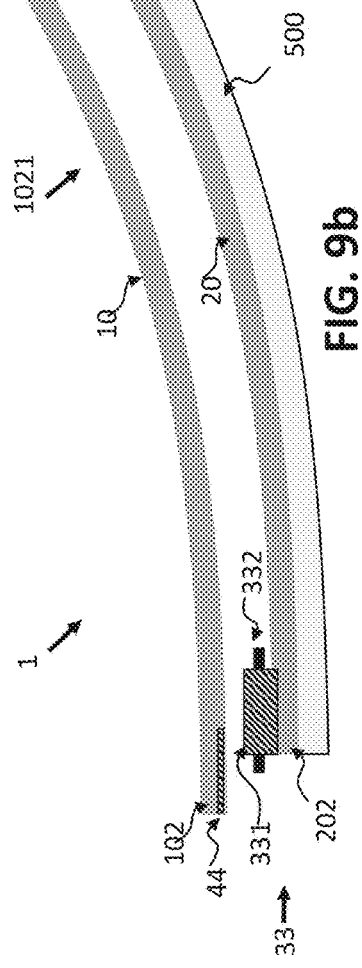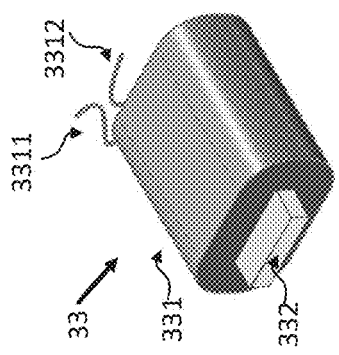

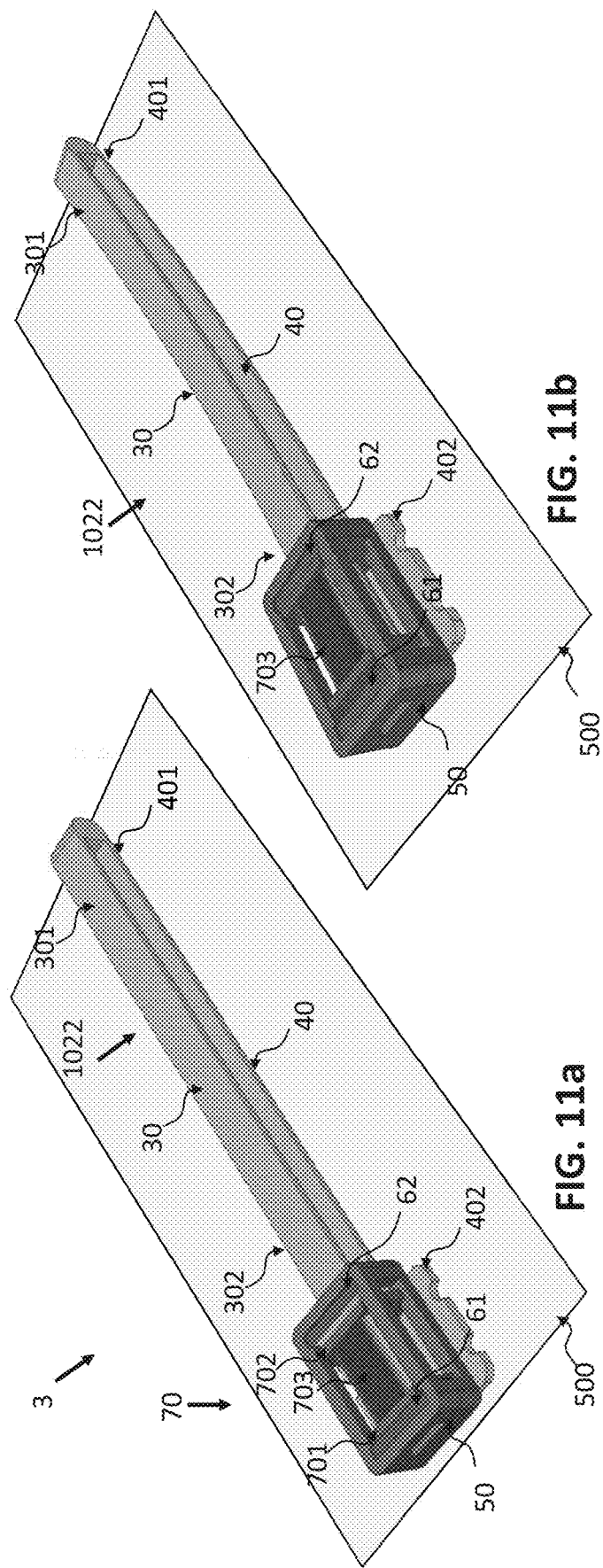

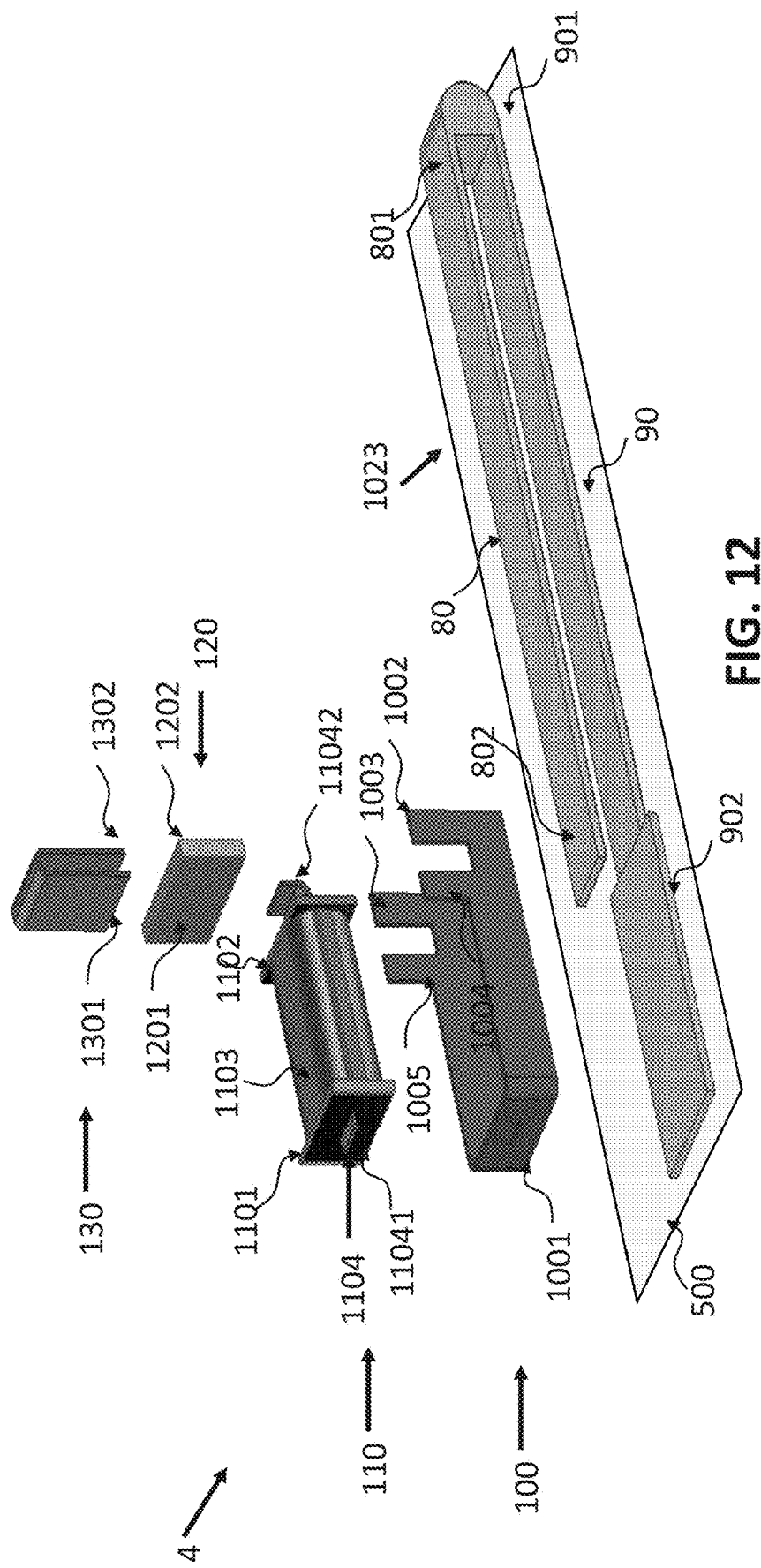

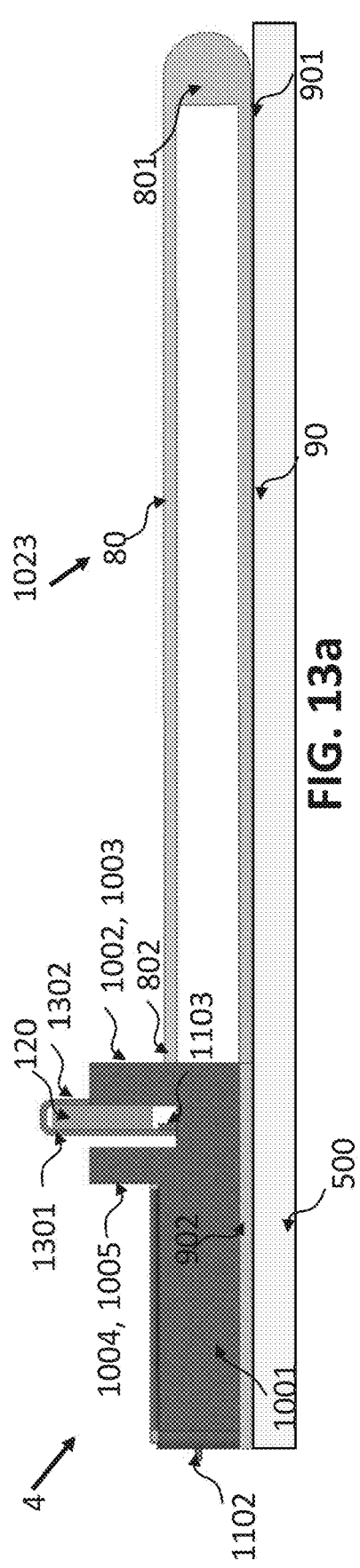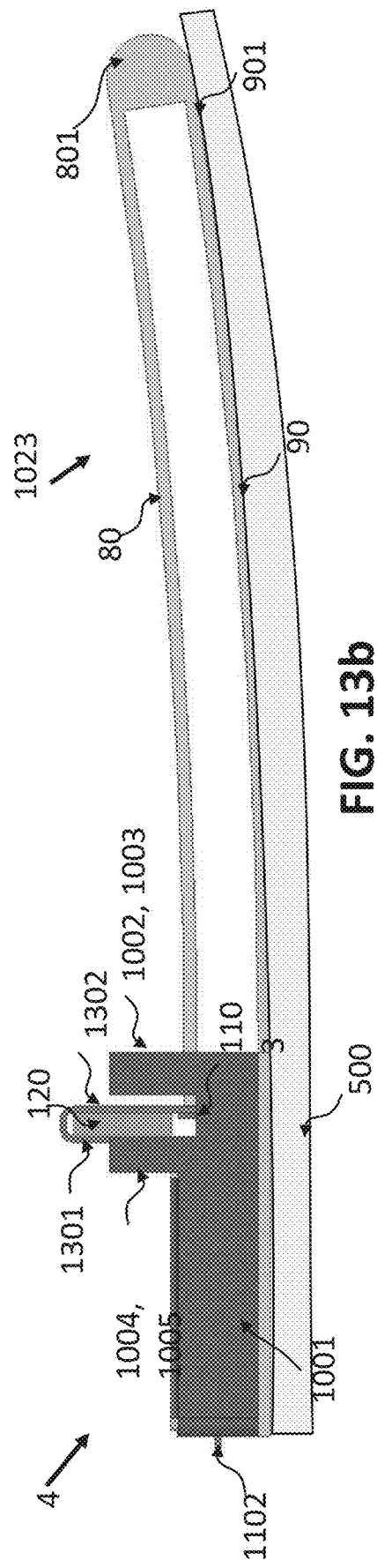
FIG. 13a
FIG. 13b

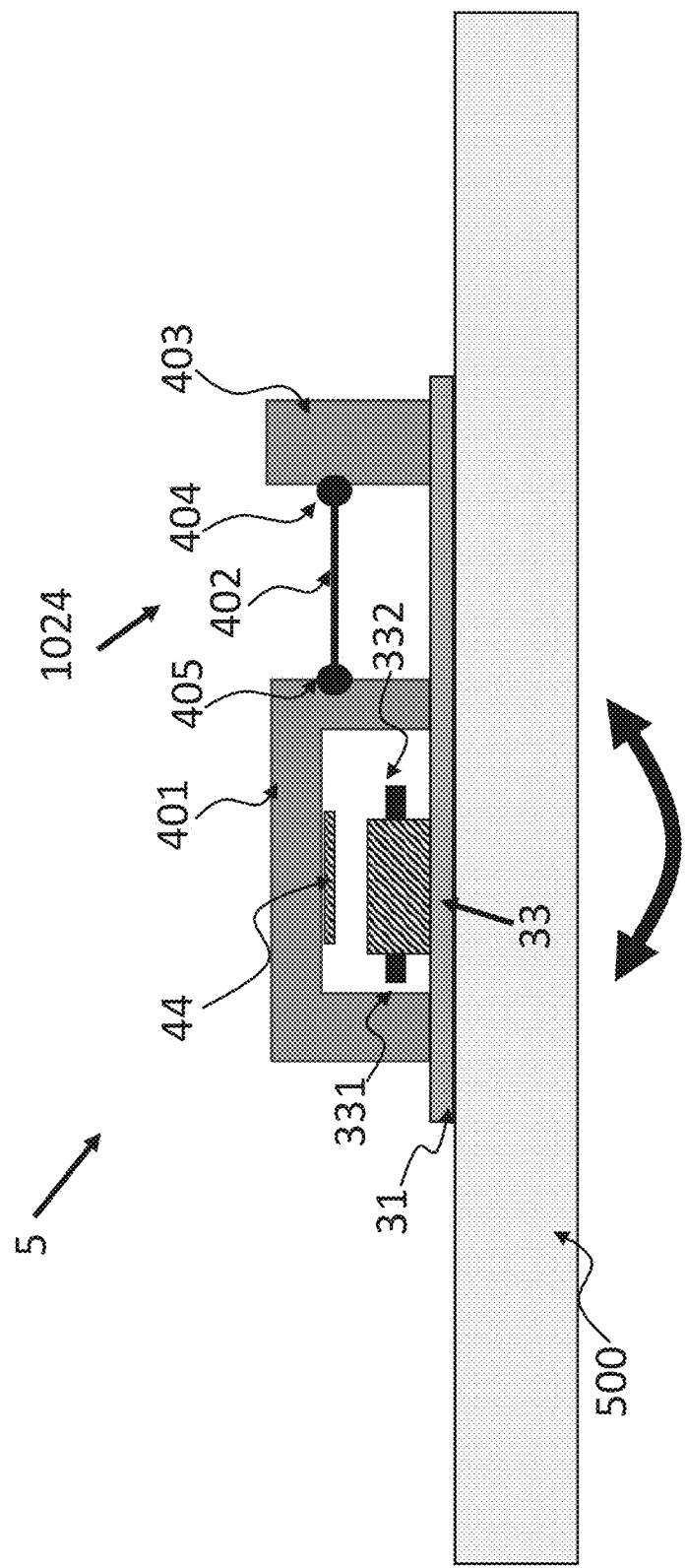

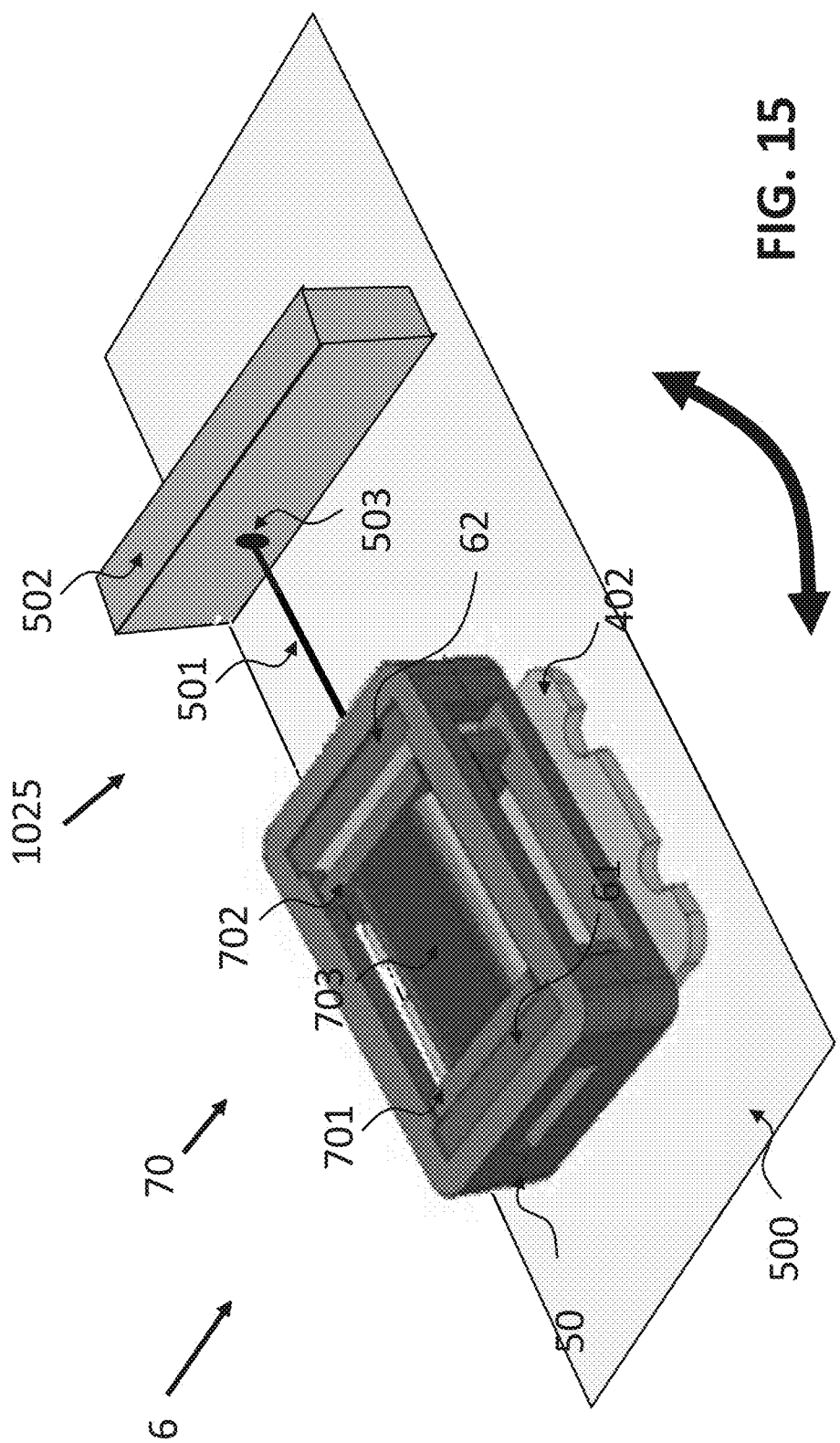

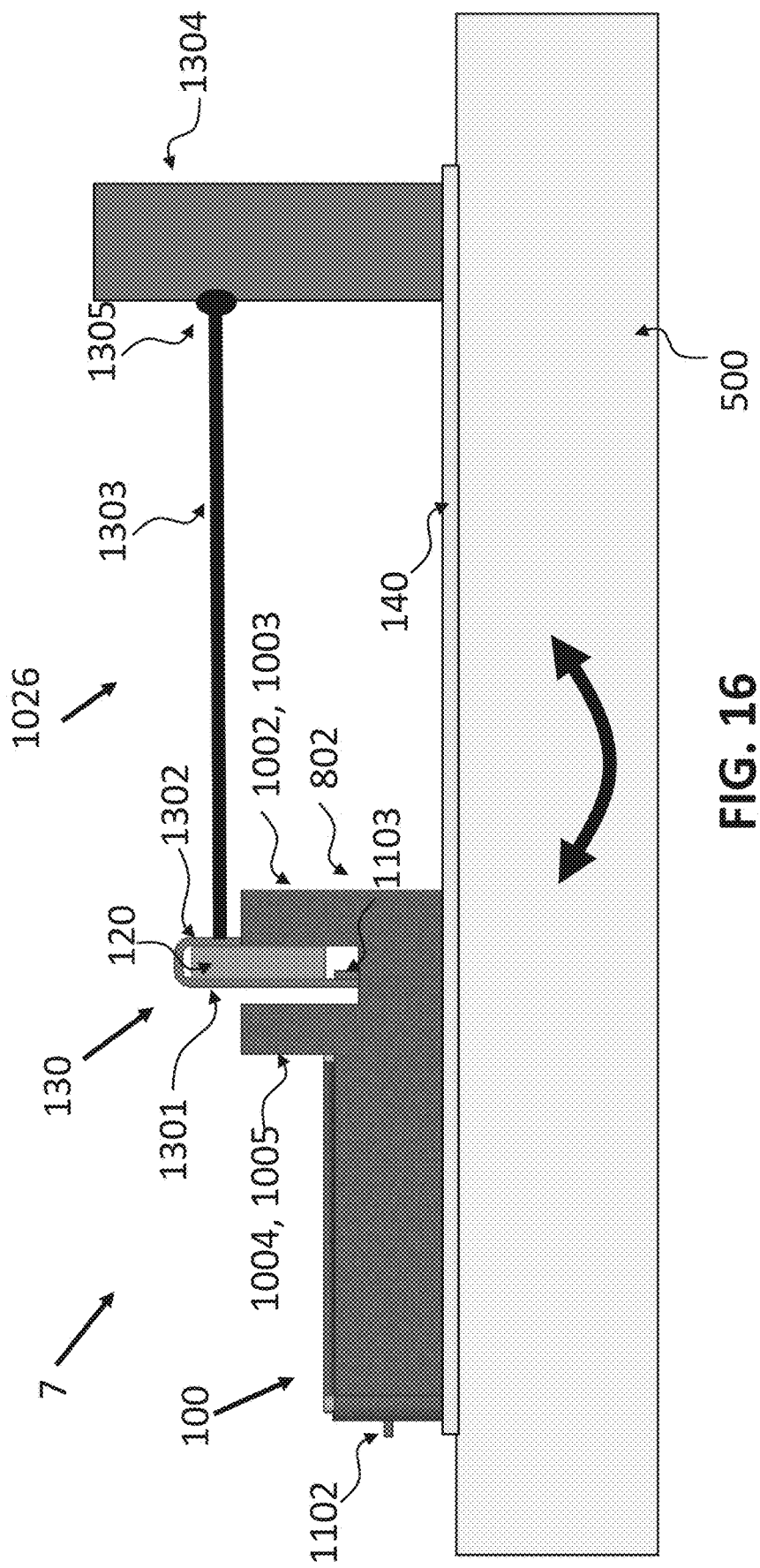

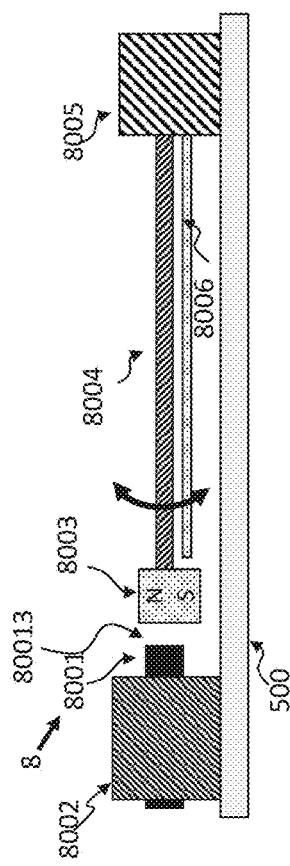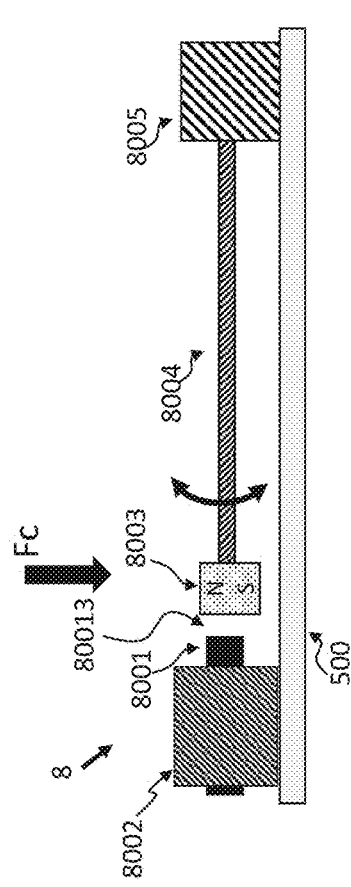
FIG. 17b
FIG. 17a
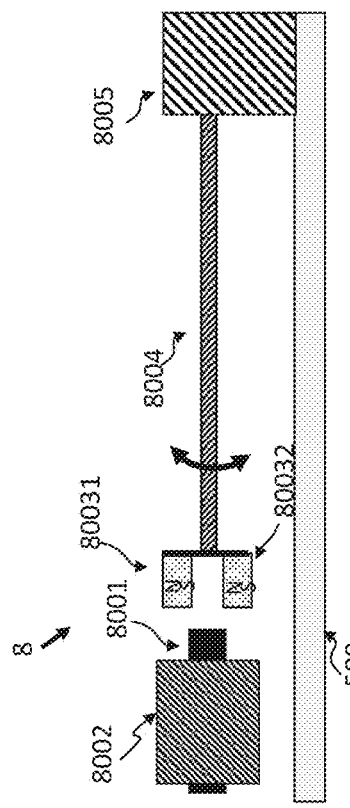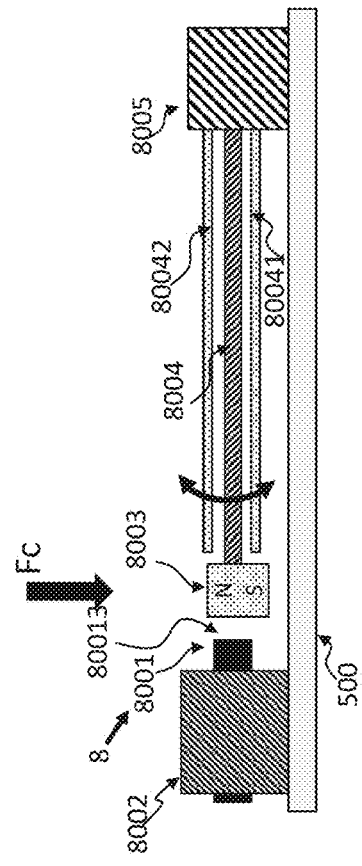
FIG. 17d
FIG. 17c

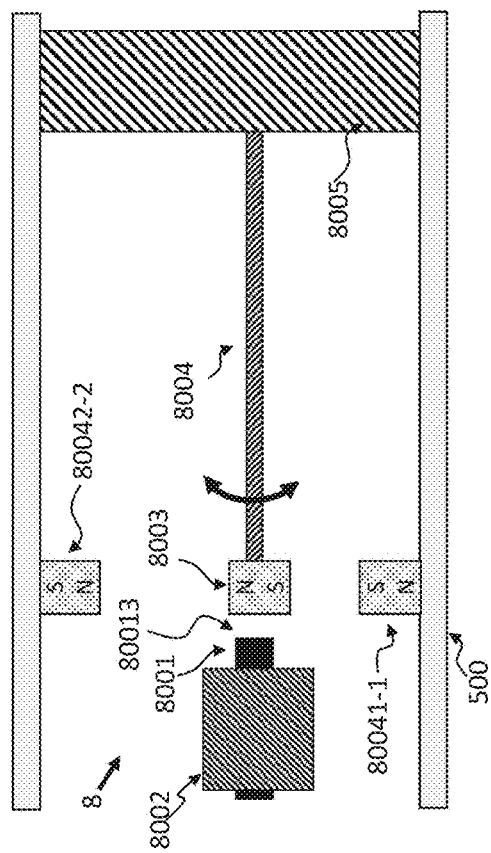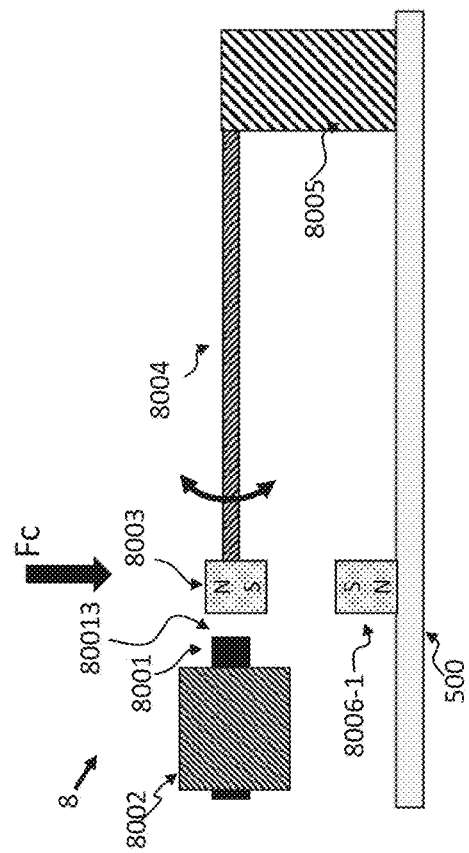

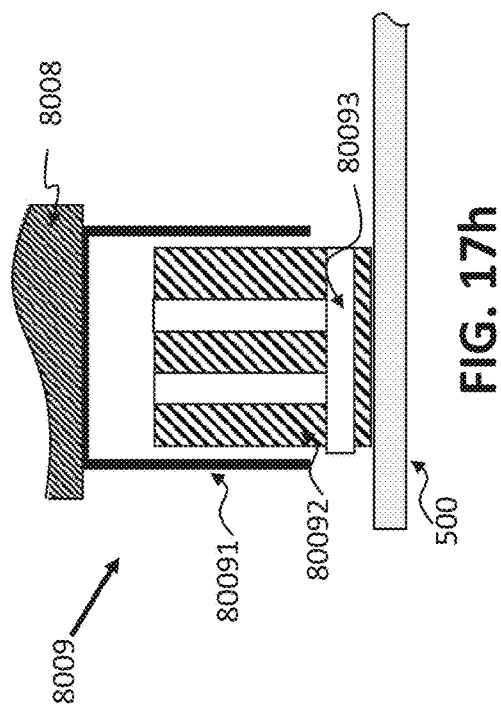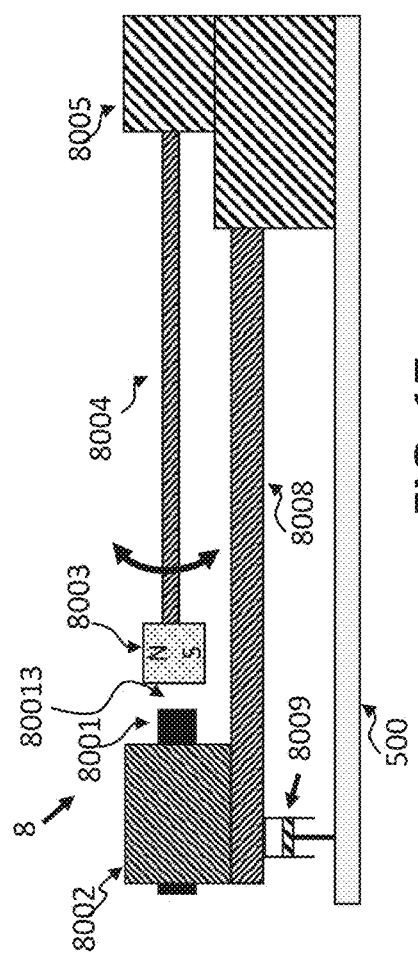

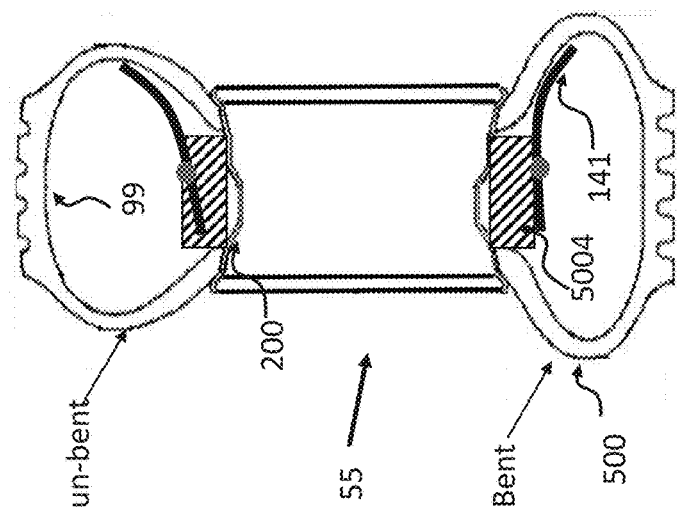
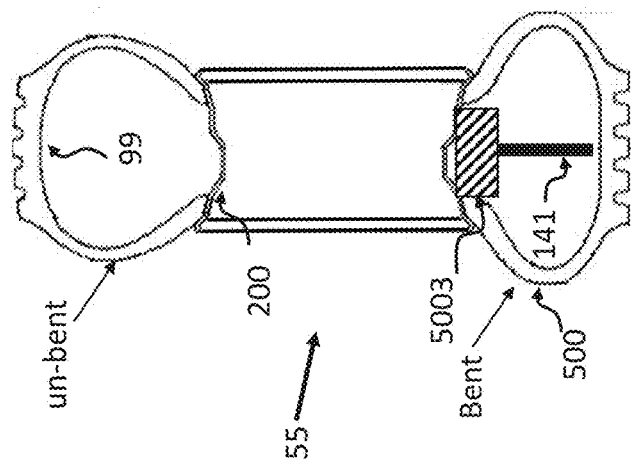
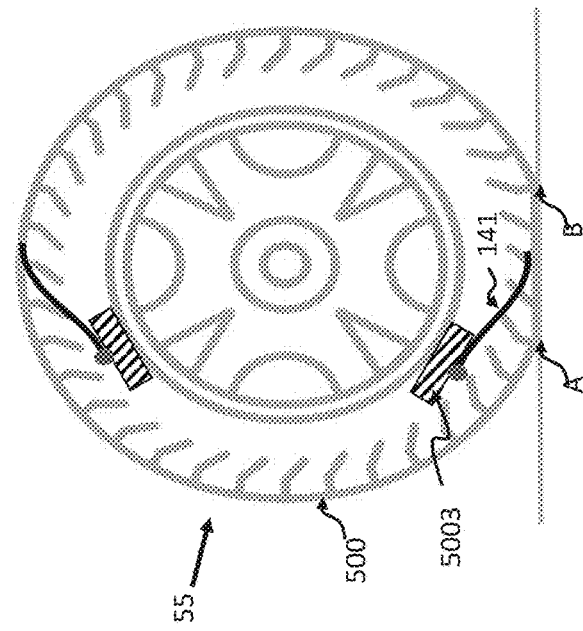
FIG. 20a
FIG. 20b
FIG. 20c

SYSTEM FOR TIRES PRESSURE AND WEAR DETECTION

RELATED APPLICATIONS

This application is a continuation in part of U.S. patent application Ser. No. 16/866,581 filed on May 5, 2020.

TECHNICAL FIELD

The present invention refers to a system for detecting pressure and wears conditions of at vehicle wheel tires.

FIELD OF THE INVENTION

Automotive tire condition monitoring is important factor impacting driving safety fuel economy/energy consumption which is responsible to CO2 and NOx emission. When considering tire role in fuel economy it is noted that the resistance of automotive tires to rolling eats up anywhere from 20% to 50% of the energy used by the car. If it was possible to cut the rolling resistance in passenger-car tires by 10%, gas mileage would improve by 3%. It is estimated that 1% to 5% of the rolling resistance stems from aerodynamic drag. Another 9% to 10% comes from road friction. And the remaining 85% to 95% is due to internal friction or hysteresis of materials. Controlling material hysteresis through tire flexing as the vehicle moves may reduce the rolling resistance and improve fuel consumption There are several critical factors that affect hysteretic losses. Few of them may be controlled by the system and method described in this invention and are detailed below:

Inflation pressure: The most influential factor on rolling resistance is tire pressure. With greater pressure, the tire becomes rounder, approaching a perfect circle, and this reduces resistance. The tire also becomes stiffer so there is less flexing. However, higher inflation pressures also influence handling and ride, so tires should not just be overinflated.

Slip Angle: The angle between the plane of the tire and the direction the car is traveling is called the slip or scrub angle. It can increase when a car takes a corner. The greater the slip angle, the higher the rolling resistance. Toe-in, the amount the plane of the front wheels are angled toward the vehicle's centerline, improves driving stability but adds to rolling resistance. Little can be done to lower the resistance caused by slip angle other than to ensure the car's wheels stay properly aligned.

Tire Rot: Rubber and plastic materials naturally degrade over a period of five to six years depending on the climate, temperature and humidity, the use and storage of the vehicle, and the air pressure levels of the tires. Dry rot is indicated by hard and brittle surfaces on the tires. As the oils in the rubber begin to evaporate, the chemical bonds break down, leaving a dry tire behind. The most common causes of dry rot include low inflation of the tires, storage near excessive heat and a lack of use. Constant exposure to sun can speed up the effects of dry rot upon the tires.

Tread depth: Rolling resistance decreases as a tire wears. That's because as the amount of tire material, that flexes and then rebounds is reduced, so do hysteretic losses. Thickness of remaining tread impacts how a tire flexes under the heat and strain of operation and thereby affects a vehicle's fuel consumption. The smaller and shallower the tread, the lower the rolling resistance, but also the poorer the wet grip. Such worn out tires no longer protects against slippage and does not provide short braking distances. Michelin tires manufacturer, states that as tire tread depth reduces, the fuel economy of the vehicle will improve as the rolling resistance decreases with the tread depth. The rolling resistance of a tire at the point of removal at the legal tread limit is 80% of the tire new state. Therefore, keeping the tire on the vehicle until the legal tread wear limit, increases the time when it is in its most fuel-efficient state and reduces the motorist fuel bill. In any event close monitoring of the tire conditions allows full use of the low power consumption range of the tire and thus reduce fuel consumption.

Tire pressure, tread wear, Tire layers separation and alignment are major contributor to fuel economy, accidents, causing tire rubber breakouts that contaminate highways, reducing commercial trucking efficiencies and more. Monitoring and maintaining tire wear will enhance public safety, as many accidents are caused by worn/exploded tires. Additionally, trucks/bus downtime is costly to operators, therefore the This invention will enhance efficiency of vehicle usage.

In the case of Electrical Vehicles (EV) improving fuel economy means longer driving range for the vehicle or higher its battery State of Charge condition. Improving EV mileage means less electricity and load of utility power generators, that often by themselves, are source of emission.

Currently vehicles are equipped with tire Pressure Monitoring System (TPMS), which is built inside the tire and wirelessly transmits the pressure (compensated with air temperature inside the tire) to allow the vehicle controller to monitor tires' pressure. The TPMS includes a battery with a life span of ~5 years. In order to monitor more tire properties, more sensors are needed within the tire. The challenge is lack of a reasonable energy source to power these sensors and wirelessly transmit the data.

Assuming the annual distance a vehicle drives is 20,000 km and the tire maximum usage is 50,000 km. In this case the tire lifetime is about 2.5 years. Assume that the car is used 6 hrs. a day which is typical for taxi or working vehicle. The number of hours a tire tracking system is working is about 2000 hrs in one year and (500)0 hrs. in 2.5 years. If this system consumes 10 mW on average and the operation voltage is 3.7V the required battery is in the range of 10,000 mAh.

For trucks with the following assumptions: Average annual travel of 90,000 km, tire maximum usage of 150,000 km, average daily driving time 7 hrs. we find that the overall driving time is about 4000 hrs. and the required battery is also in the range of 10,000 mAh.

Such large batteries that can also work in extreme temperature are large, heavy and expensive and can't be mounted inside a rotating wheel, and therefore the solution as proposed in one embodiment in this invention is the use of energy harvester that harvest energy from the wheel rotation in combination of small primary battery and capacitors.

PRIOR ART

Several patent were published aiming to offer sensors to sense tire conditions. Patent number CA 2214700 C filed in 1995 discusses in-tire sensors sending data to a receiver outside the tire upon request from this receiver. This patent has expired.

Patent number WO 2013/114388 A1 comprises Tire Pressure Optimizing System (TPOS) and Tire Pressure Control Units (TPCU). SATPOS instantaneously senses and controls the tire pressure in order to reduce emergency by smartly sensing, performing context aware computing and directing the TPCU to instantaneously control the tire pressure in the right time and pressure and right tires. TPOS performs sensing, pre-computing, current computing for controlling the tire pressure during critical situations, post computing to optimise tire pressure after overcoming accordingly.

Patent number TW 499372 B discusses a system and method for monitoring tread wear, shock absorber performance, balance condition of a vehicle tire, and/or rotational speed of a vehicle wheel using a sensor which senses at least one of radial and lateral acceleration of a tire to provide acceleration signals. To monitor tread wear, at least one processor is provided and is responsive to acceleration signals from the sensor and determines at least one resonance frequency of at least one of the radial and lateral acceleration of the tire, using fast Fourier transform (FFT) of the radial and/or lateral acceleration signals to determine a resonance frequency in the range of 3 0-60 Hz, compares the determined at least one resonance frequency to stored frequency indicative of no tire wear to determine a frequency shift, and determine tire tread wear on the basis of the frequency shift, and provides an information signal indicative of tire tread wear which is transmitted to a driver information display.

Patent number WO 2018/137920 A1 describes a system and method for evaluating tire wear through the acoustical noise it makes. The system includes an acoustical sensor, a processor and machine learning that determines the degree of wear of each tire when subject to different inputs that includes vehicle speed, wheel speed, engine and vehicle noise. The system provides an output of the degree of wear of the or each tire to a user of the vehicle.

Patent number US 2019/0001756 A1 discusses a system for monitoring a condition of a tread of a tire for vehicles using a sensor fixed to a portion of the tread and consisting of extrinsically conductive polymers. Data from the sensor is transmitted to a data processing unit that uses algorithms to interpret the variation in the sensor reading in order to determine the tread thickness.

Patent number CN 2703664 Y describes a tire monitoring and display device, comprising a system mounted in the wheel of a vehicle where the system comprises a 140 tire pressure sensor, a tire volume temperature sensor, a data processor which transmits tire pressure and temperature to a receiver outside the tire and a power supply that powers these devices. The system alerts when the tire pressure or temperature of any of the four wheels of the vehicle deviates from the standard values. The system also alerts when the power of the power supply is low.

The patent described above offer limited means of sensing tire condition because of limited available power inside the tire. This invention is a wireless, multi-sensors solution for real time automotive tire wear, pressure monitoring and management enabled by an energy harvesting mounted inside the tire, without the need for a very large battery.

BRIEF DESCRIPTION OF THE FIGURES

FIG. 1—schematic description of the invention
FIG. 2—schematic description of tire property as function of time and travel distance
FIG. 3—Possible sensors to be used inside a tire
FIG. 4—Embodiment of power source
FIG. 5—Embodiment of power source
FIGS. 6a and 6b—Embodiments of a piezoelectric based energy harvester as a power source for powering devices inside tire
FIG. 6c depicts energy harvesters (22) mounted on the tire.
FIGS. 9a-9c—Embodiments of electromagnetic based energy harvester as a power source for powering devices inside tire
FIG. 10—Embodiments of electromagnetic based energy harvester as a power source for powering devices inside tire
FIGS. 11a and 11b description of embodiment in FIG. 9
FIG. 12—Embodiments of electromagnetic based energy harvester as a power source for powering devices inside tire
FIGS. 13a and 13b—description of embodiment in FIG. 11
FIG. 14—Embodiments of electromagnetic based energy harvester as a power source for powering devices inside tire
FIG. 15—Embodiments of electromagnetic based energy harvester as a power source for powering devices inside tire
FIG. 16—Embodiments of electromagnetic based energy harvester as a power source for powering devices inside tire
FIGS. 17A-17L—Embodiment of electromagnetic energy harvester for harvesting power from tire or from a rim of a wheel.

DETAILED DESCRIPTION OF THE INVENTION

Figure 2:
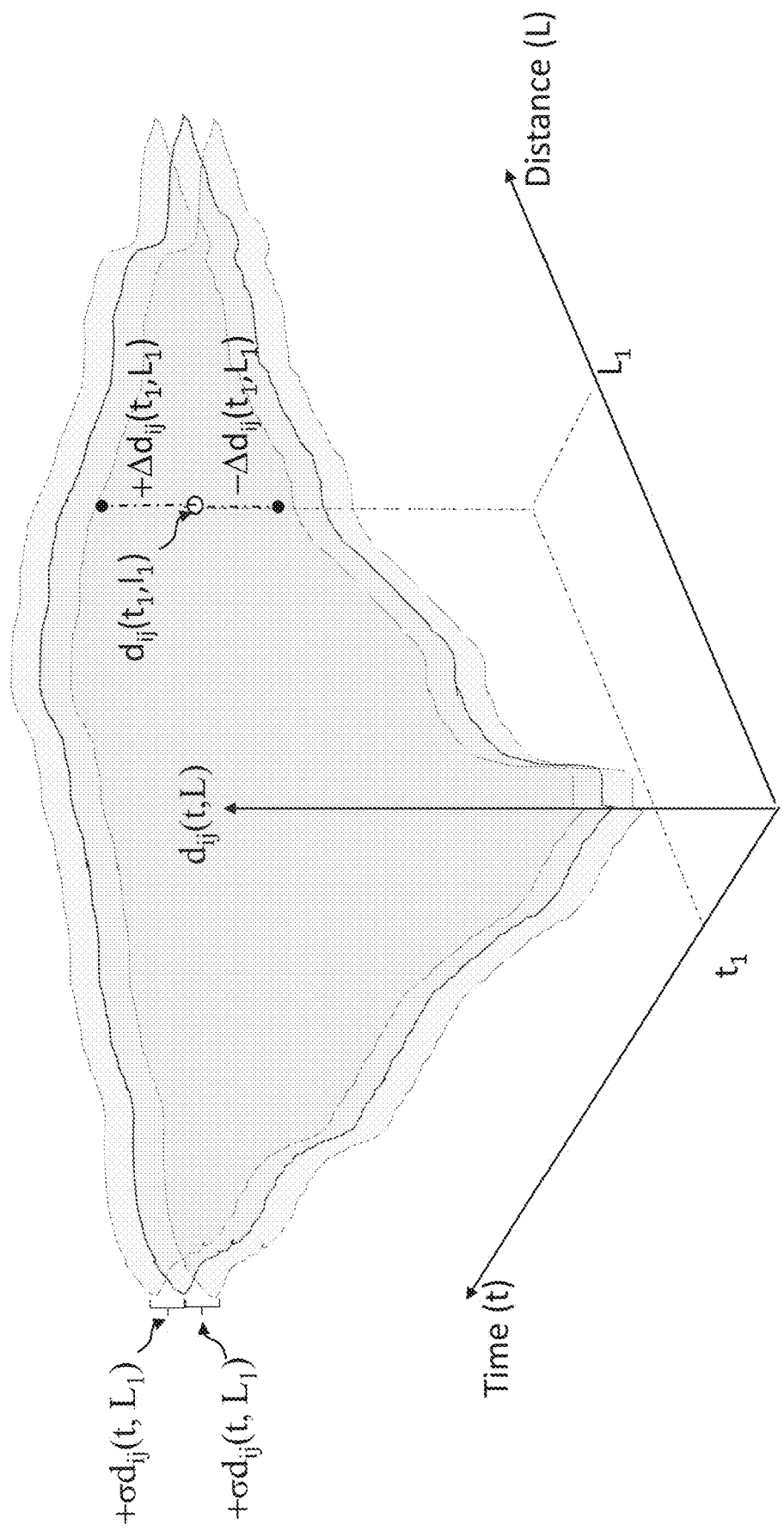

This invention is about a system for detecting pressure and wear conditions of tires. One embodiment of this invention is a system (1) for detecting pressure and wear conditions of at least a first vehicle wheel tire (2a) and a second vehicle wheel tire (2b), as shown in FIG. 1. The system comprises a first module (3) that is designed to be positioned inside (21a) the first wheel and a second module (3) that is designed to be positioned inside (21b) the second wheel, wherein each module comprises sensors (31), a module processor (32), a module transmitter (35), and a power source (34) for powering the sensors, module processor and module transmitter. The system also comprises a remote receiver (4) and a data processor (5) that are designed to be positioned outside the wheels. The output of the sensors of each wheel can be fed to the module processors of that wheel and the module transmitters of each wheel transmit the processed data to the remote receiver. The data processor is deigned to analyze the received processed data, and to provide alert based on comparing the processed data from the first wheel with the processed data from the second wheel. Alert may include any technical service including tire replacement or not adequate tire pressure not balanced or not adequate tire slip angles or other not adequate tire state, as well as warning alert related to driving safety and fuel consumption.

In one embodiment the data received from each wheel may be viewed as a string of time dependent values $d_{ij}(t,L)$, where $d_{ij}$ refers to data received by a sensor i in tire j, t refers to the time and L refers to the distance the specific tire traveled while in use by the vehicle. Conclusions regarding the tire conditions may be drawn by comparing the values of sensors in different tires, i.e. $d_{ij}(t,L)-d_{ik}(t,L)$, or $d_{ij}(t,L)/d_{ik}(t,L)$.

In another embodiment the value $d_{ij}(t,L)$ of the tire is collected over long period of time (t) and distance (L), and from several tires such that a statistical 3D map can be obtained as schematically shown in FIG. 2. This 3D mapping has a statistic variation that is exemplified by $+\Delta d_{ij}(t,L) - \Delta d_{ij}(t,L)$ which may represent a normal statistic and may be a function of t and L. In FIG. 2 the value $d_{ij}(t_1, L_1)$ represent the normal value of $d_{ij}$ at time $t_1$ and distance $L_1$. Deviation above a certain value $+\sigma dij(t, L_1)$ or deviation below a certain value $-\sigma dij(t_1, L_1)$ may be identified by the system as a "not normal behavior" and will alert the user.

For example, the vibration of a tire may have a specific spectrum that may change over the time and traveling distance. The vibration spectrum may also depend on the temperature. Temperature has an accumulative effect that degrades the tire over time. In order to take the temperature into account a temperature stress function $S_{t,T}$, may be defined.

One possible form of $S_{t,T}$ is $S = \Sigma_{T1}^{TN} \Sigma_0^t A(T_i) t^x T_i^y$, where A is constant, t is the time the tire temperature was exposed to where the temperature is divided into segments that are represented by $T_1 \ldots T_N$. x and y are parametric constant that may depend of tire and environment parameters such as time.

Another way to describe the effect of the temperature is through Arrhenius function such that $St = \Sigma_{T1}^{TN} \Sigma_0^t B*EXP(E_{a,i}/kT)$, where, B is constant, k is Boltzmann constant and $E_{a,i}$ is the activation energy for failure i.

When taking the temperature into account the 3D diagram shown in FIG. 2, becomes a 4D diagram such that $d_{ij}(t, L, S)$. The $d_{ij}(t, L, S)$ where 'i' can for example be as large as 5 sensors where each sensors may be described in several dimensions. The multi dimension description of such a system may be simplified, for example by using Principal Component Analysis (PCA) that reduces the number of dimensions of the system and offers a fast identification of tire problem. Simplification may take place by using other methods such as Neural Network or anomaly analysis.

Figure 3:
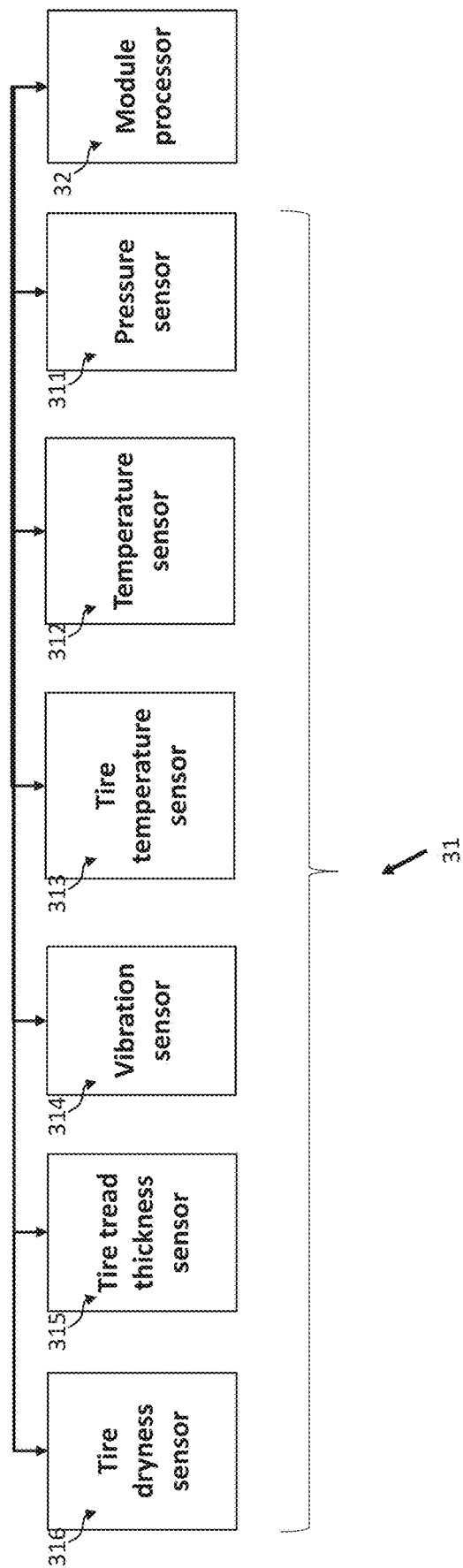

Reference is made to FIG. 3 teaching that the sensors in the module may be pressure sensor (311), volume temperature sensor (312), tire material temperature sensor (313), vibration sensor (314), tire tread thickness sensor (315), and tire dryness sensor (316).

Figure 4:
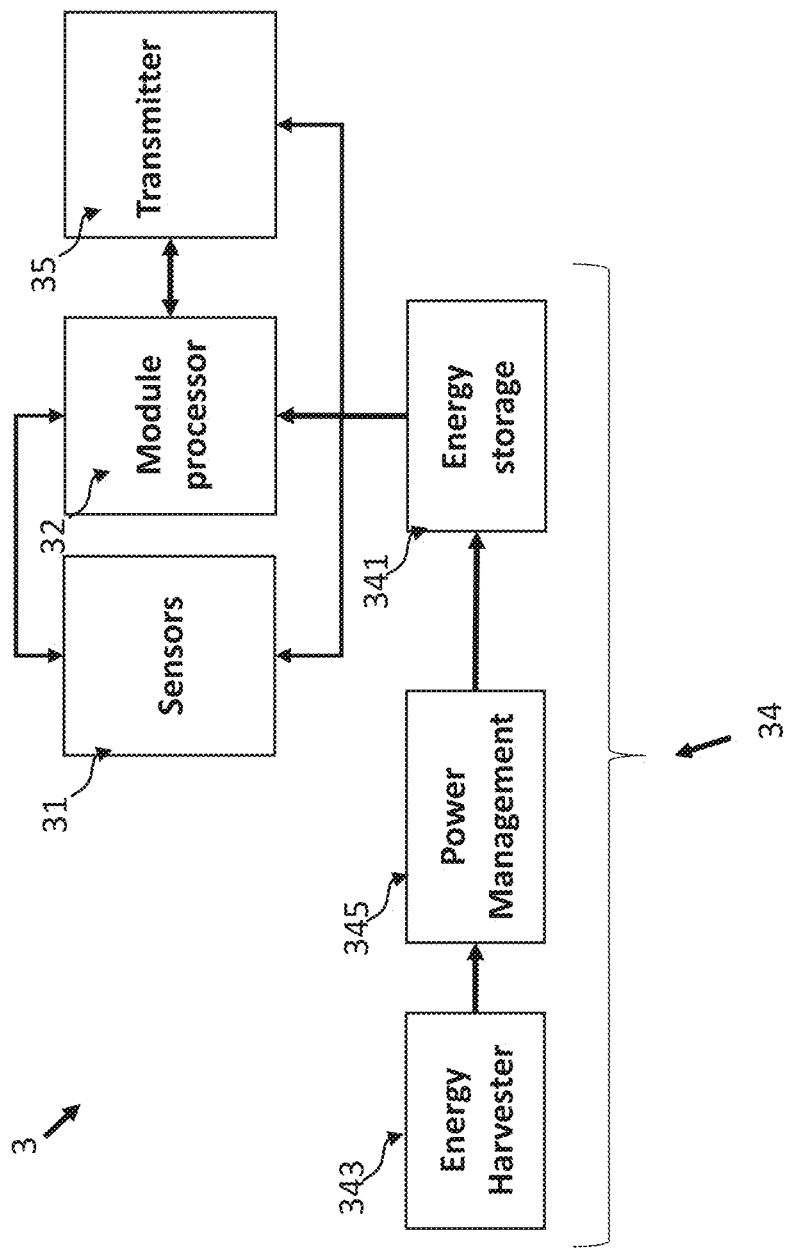

In one embodiment the power source (34) may be a primary battery. In another embodiment the power source (34) includes an energy harvester (343), a power management circuit (345) and energy storage device (341) as demonstrated in FIG. 4. In this case the energy harvester harvest energy from rotations the wheel and wherein the harvested energy is managed by the power management circuit to result in a regulated power that charges the energy storage device. Energy storage device may be a rechargeable battery or a capacitor.

Figure 5:
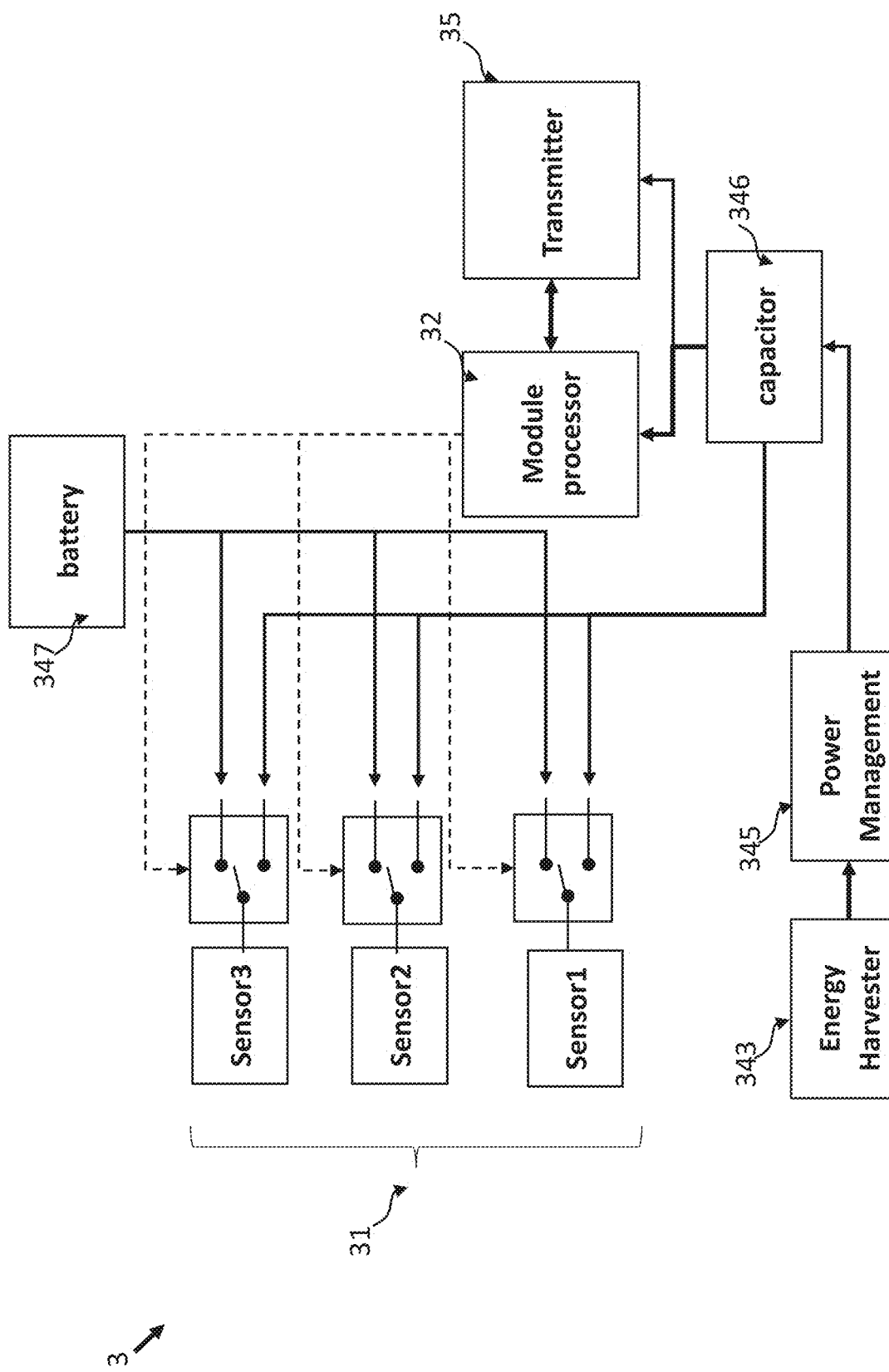

In another embodiment, shown in FIG. 5, the power source (34) includes a primary battery (347), and an energy harvester (343), a capacitor (346) and a power management circuit (345), such that the energy harvester harvest energy from rotations of the wheel, and the harvested energy is managed by the power management circuit to result in a regulated power that charges the capacitor (346), and such that at least one of the sensors is designed to be powered selectively either by the capacitor or by the primary battery according to charging scheme controlled by the module processor (32).

Capacitors and primary batteries that are suitable extreme operating temperature are available in the market. On the other hand, rechargeable battery may typically operate in a limited temperature range. The embodiment above splits the sensors between sensors type A that require high sampling rate or are required even when the car doesn't move or moves at very low speed, and sensors type B that require low sampling rate or are not required to be active when the car is at rest or moving very slow; In this case the capacitor power sensor type B as long as it has enough power, while primary batter powers sensor type A. When the car starts to move capacitor (346) start to charge up. Once the charge in the capacitor (346) is above a predetermined value the module processor (32) disconnects the primary battery (347) and power sensors type A as well through the capacitor (346). When the charge in the capacitor (346) drops below a predetermined value the module processor (32) disconnect the capacitor (346) from powering sensors type A and connects the primary battery (347) instead.

Sensor type A may be for example pressure sensor as in currently available Tire Pressure Monitoring System (TPMS) that is powered by primary battery. Sensor type B may be for example related to tire temperature, vibration, or dryness.

In another embodiment of the invention some of the sensors may be powered only when the wheel rotation speed above predetermined Rounds Per Minute (RPM), that is equivalent to vehicle velocity of 10 km/hr.

In another embodiment the module may be located on the tire or on the tire's rim or it may be divided between the tire and the rim depending on the number of sensors.

The energy harvester discussed in different embodiments may be for example use piezoelectric, electromagnetic, thermal, or other methods that converts one form of energy into electric energy.

Reference is made to FIG. 6a which schematically illustrates a Piezoelectric energy harvester (21) that may be used as a power source for devices inside a tire, as suggested by several patent applications such as WO 2008/034825 A1, WO 2001/080327 A1, CN 1852017 A. The harvester uses the bending of a piezoelectric material to harvest energy. The piezoelectric harvester comprises a piezoelectric layer (21A) encapsulated between two electrodes, (21B) and (21C) where power is generated upon bending of the energy harvester (21). The piezoelectric device may be bonded to the tire (500) and generate electricity when the tire, at the location of the piezoelectric harvester, bends as it rolls on the ground.

Reference is made to FIG. 6b which schematically illustrates another piezoelectric energy harvester (22) for conversion of mechanical energy in a seismic mass (221) suspended over a spring (222) that vibrates while a wheel rotates as demonstrated in FIG. 6b. In that case energy harvester (22) may be mounted on the tire or on the rim of the tire as demonstrated in FIG. 6c.

Figure 7A:
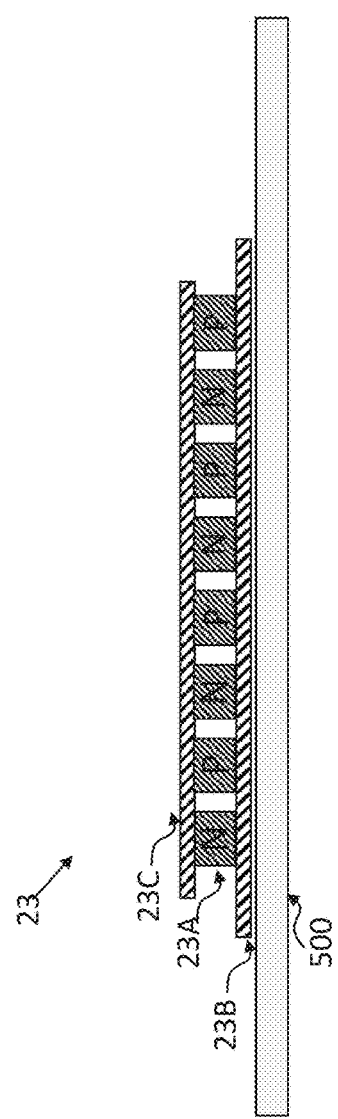
FIGS. 7a and 7b—Embodiments of thermoelectric based energy harvester as a power source for powering devices inside tire
FIGS. 8a-8b—Prior art of Electromagnetic energy harvester used inside a tire.
Figure 7B:
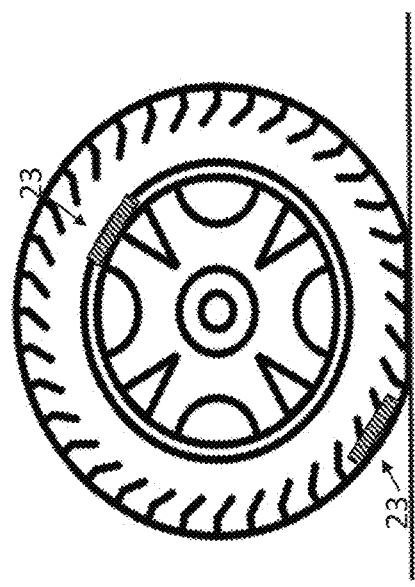

Reference is made to FIG. 7a which schematically illustrates a thermoelectric energy harvester (23) that may be used as a power source for devices inside a tire. Such harvester was suggested in patent number CN 205365242 U. The harvester is based on temperature difference between the two sides (23B) and (23C) of a thermo element (23A). Thermoelectric harvester (23) may be fixed to the tire and use the temperature difference between the inner side of the tire and the road that serves as a reservoir. Alternatively, a thermoelectric energy harvester (23) may be fixed to the rim and harvest energy from the temperature difference between the inner side of the tire and the rim that is cooled during the wheel rotation and serves as a reservoir. These two options are demonstrated in FIG. 7b.

Figure 8B:
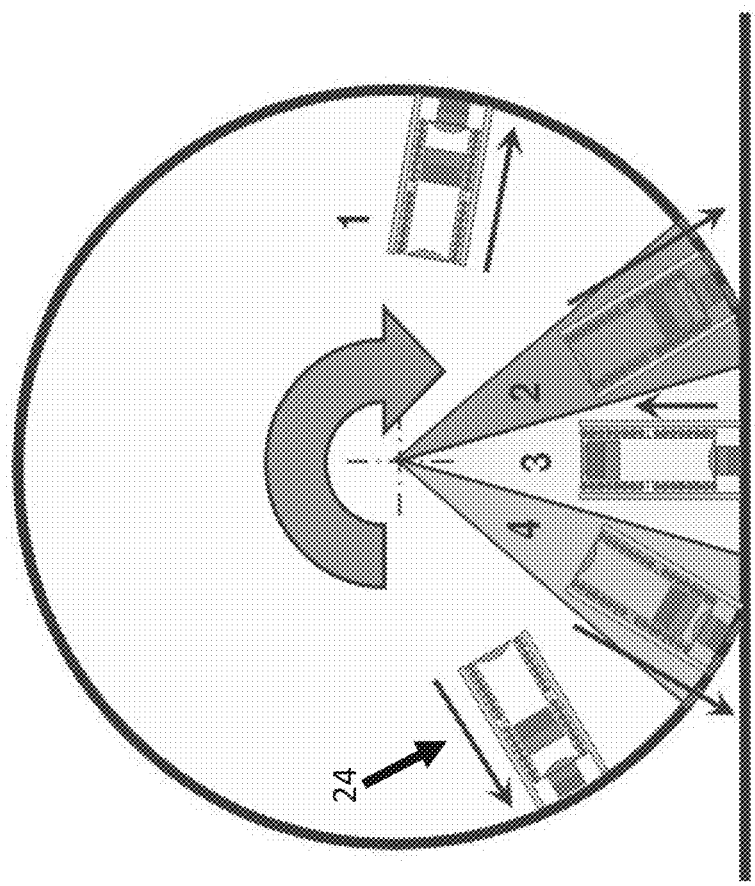
Figure 8A:
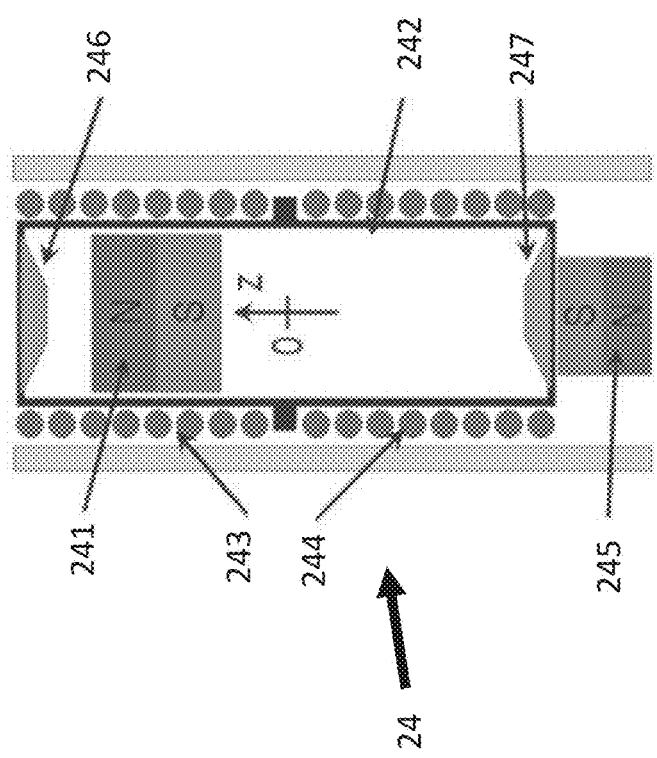

Reference is made to FIG. 8a showing the general setup of the energy harvester (24) by Stefano Tornincasa et. al, as published in a paper titled "Energy harvester for vehicle tires: Nonlinear dynamics and experimental outcomes." Moving magnet (241) slides inside a guide (242) around which two series connected coils (243 and 244) are wound in opposite direction so that their electromotive force is summed. A preload fixed magnet (245) is placed in the lower lid to push the floating magnet to the upper lid. Two rubber bumpers (246 and 247) are stuck on the inner surface of the lids to avoid destructive impacts between moving magnet (241) and end strokes. The movement of the floating magnet in the guide (242) changes the flux linkage in the coils and produces an electromotive force that is available to power supply an electrical load. A similar configuration has been proposed and analyzed by Mann and Sims in a paper titled "Energy harvesting from the nonlinear oscillations of magnetic levitation," using a symmetric preload such that preload magnets are fixed to the upper lid and to the bottom lid.

Reference is made to FIG. 8b demonstrating energy harvester (24) mounted on a tire. As a result of the centrifugal force, moving magnet (241) is pushed towards the fixed magnet (245). This is indicated in the figure by position 1. As the harvester reaches position 3, the tire flattens and the centrifugal force drops to zero, and the moving magnet is pushed by the fixed magnet along the guide (242), during which electricity is generated in the coil. It is noted that as the velocity increases the time in which the harvester is in the flat area becomes smaller hence the response time of the magnet drops and so is the generated power. In the paper it is shown that for the specific design, the power generated bounded by 3 mW and start to drop around vehicle speed of 100 kmh.

It is noted that the energy harvester described in FIG. 8a uses the centrifugal force to push the free magnet towards the fixed magnet. The centrifugal force is required to make this harvester work. As soon as the centrifugal force goes to zero, at the flat part of the tire, the free magnet is rejected by the fixed magnet and energy harvesting takes place. It is noted that as the speed increase the centrifugal force increases as well but the flat part of the tire, where energy harvesting takes place, becomes narrower to the point where the response time of the free magnet movement is too long to allow sufficient magnet movement, before the centrifugal force acts again.

Reference is made to FIGS. 9a and 9b, which schematically illustrates one embodiment of an electromagnetic energy harvester that may be used as a power source for devices inside a tire. The harvester, attached to tire (500), consists of a bending to movement device (1021) comprising two arms (10) and (20) that are connected to each other on one side (101 and 201) such that tire bending results with a lateral movement of point (102) relative to point 202. Magnet (44) is connected to side (102) of the arm and an electromagnetic device (33) that comprises a coil (331) and a ferromagnetic core (332), is connected to side (202) of the arm. A bending of the tire generates a relative lateral movement between side (102) and side (202) such that the magnet moves relative to the coil and electrical power is generated in the coil.

FIG. 8c. shows details of device (33). Wires (3311) and (3312) are the ends of the coil where electric power is generated. Throughout this invention referring to power generated in a coil refers to the two ends of a coil as described in FIG. 8c.

We've tested this configuration in the lab. The setup included a coil resistance of 150 Ohm. A fast movement of a magnet along the coil generated 3.5V impulse with impulse width of 200 ms. With a 270 ohm load the calculated energy is 71 uJ.

Figure 10:
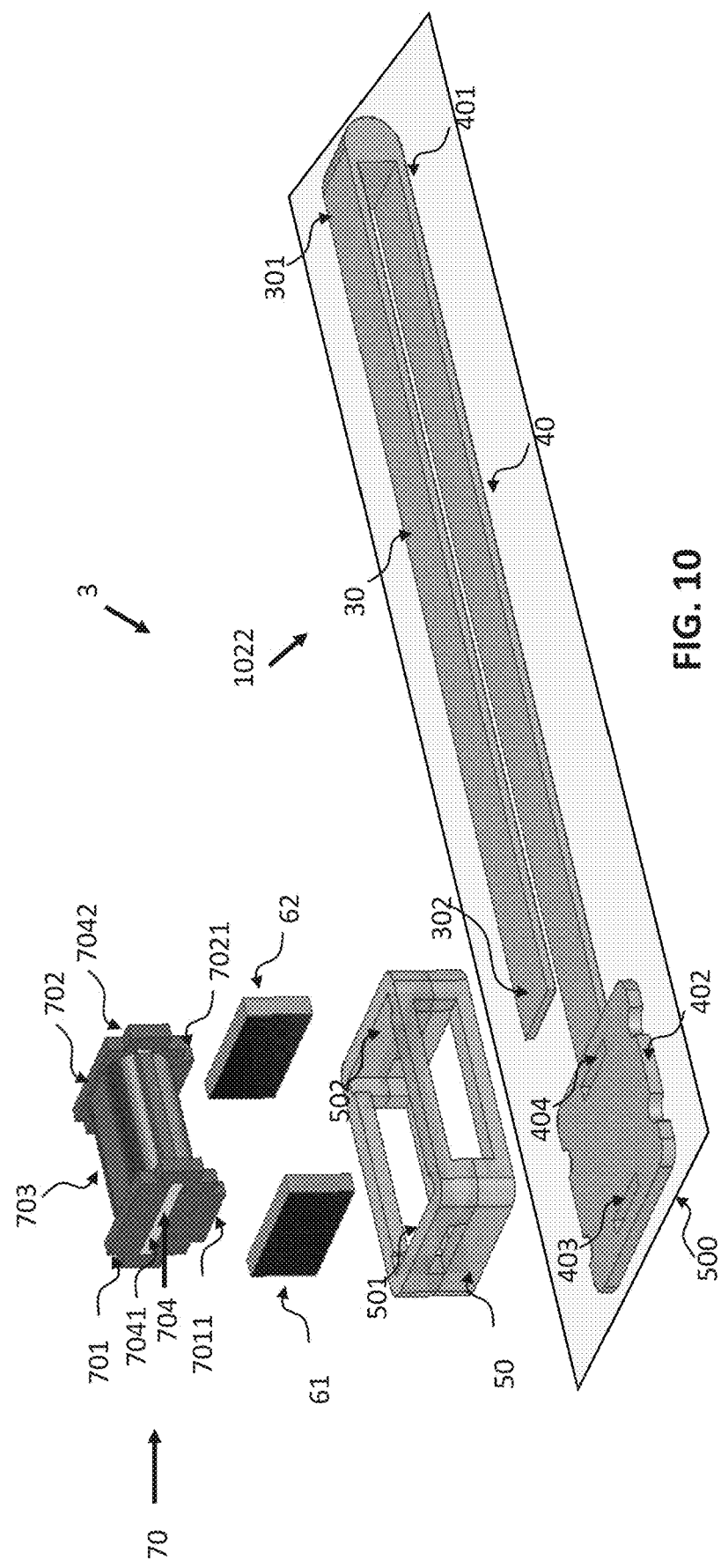

Reference is made to FIGS. 10 and 11, which schematically illustrates another embodiment of an energy harvester that may be used as a power source for devices inside a tire. FIG. 10 is a blow-up view of harvester (3). The harvester, attached to tire (500), consists of a bending to movement device (1022) comprising two arms (30) and (40) that are connected to each other on one side (301 and 401) such that tire bending results with a lateral movement of point (302) relative to plate (402). Frame (50) is connected to (302) such that it moves together with (302). Magnet (61) and (62) are connected to the two facing facets (501, 502) of the frame (50) such that the same magnetic poles of these magnets are facing each other. Electromagnetic unit (70) comprises holders (701) and (702), coil (703), and ferromagnetic core (704) as detailed in FIG. 9c, such as metal with side (7041) and side (7042), such that the coil is wrapped around the ferromagnetic core and such that the coil wire has two ends. Side (7042) is marked in FIG. 10 but cannot be seen. Electromagnetic unit (70) is fixed to plate (402) using tenons (7011) and (7021) that are locked into dints (403) and (404), respectively.

FIGS. 11a and 11b shows the harvester in two states. In FIG. 11a the arms are at first state such that side (7041) of the core touches magnet (61). When arms (30), (40) bend frame (50) is pushed and with it the two magnets, such that now side (7042) touches magnet (62). This action reverses the polarity of the magnetic flux on the electromagnetic unit that generates an electromotive impulse between the coil ends.

We've found that flux inversion generates much higher power. Testing of such configuration with a 9.3 Ohm coil with core generated 3V on a 22 Ohm resistor yielding energy of 0.61 mJ per switching.

The reason for such higher energy can be learned from equation 1

$$E = -N \cdot d\Phi/dt \qquad (1)$$

Where E is the electromotive force measured in volt, N is the number of turns of the coil a and F is the magnetic flux. Moving a magnet relative to a coil generates $d\Phi/dt$. Clearly the large $d\Phi/dt$ the larger E. Reversing the magnetic flux results in a very high change to the magnetic flux and thus the high electromotive force. This configuration is referred to as toggling mode as the polarity of the magnetic flux is toggled between two states.

In order to generate large flux and therefore large flux changes, it is possible to use a ferromagnetic wrapping to confine the magnetic field close to the coil.

The embodiment shown in FIGS. 10 and 11 use two magnets in order to reverse the magnetic flux in the core. Yet it is possible to use one magnet in order to reverse the magnetic flux in the core as schematically shown in FIGS. 12 and 13. FIG. 12 is a blow-up view of the harvester. The harvester, attached to tire (500), consists of a bending to movement device (1023) comprising two arms(80) and (90) that are connected to each other on one side (801) and (901) such that tire bending results with a lateral movement of point (802) relative to plate (902). Frame (100) is made of ferromagnetic material such as metal, that is bent such that extensions (1002), (1003), (1004), (1005) are formed.

The electromagnetic unit (1100) comprise holders (1101) and (1102), coil (1103), and ferromagnetic core (1104), with sides (11041) and (11042), such that the coil is wrapped around the ferromagnetic core and such that the coil has two ends as detailed in FIG. 9c.

Unit (120) is a magnet such that side (1201) is one magnetic pole and side (1202) is the opposite magnetic pole. Unit 130 is ferromagnetic material such as metal.

FIGS. 13a and 13b shows the constructed harvester in two states. Frame (100) and electromagnet unit (110) are fixed to plan (902) such that side (11041) of core (1104) is connected to frame (100). Magnet (120) is inside unit (130) such that side (1201) touches side (1301) and side (1202) touches side (1302).

In FIG. 13a the harvester is at one position such that side (1302) touches extensions (1002) and (1003) and such that side (11042) of core (1104) touches side (1301). In FIG. 12b the tire (500) bends and cause the bending of the two arms such that 1301 touches extensions (1004) and (1005) while side (11042) of core (1104) touches side (1302).

Moving from one position to the other position reverses the polarity of the magnetic flux in the core and results in an impulse of electromotive power between the two ends of the coil. Such a configuration may harvest energy as high as several milli-joules per switching. It is noted that in this embodiment a ferromagnetic material surrounds the coil such that the magnetic field is even denser around the coil such that the change in the flux that is induced by toggling between the two positions is higher.

One major importance of this invention is therefore toggling between two states each time the tire bends. Clearly this means that a minimum bending of the Bending Energy Harvester is required for such switching step to take place.

The embodiment above uses the bending to displacement convertor that is described in PCT number PCT/IL2019/051302, where the displacement was used to generate rotation in a generator. In the current patent application this displacement is used to create a relative lateral movement between a magnet and a coil or for toggling between states that cause magnetic flux reversal in a core.

It is noted that the use of such bending to lateral displacement convertor is used only to exemplify a mechanism for such relative movement and such magnetic flux inversion, and that other mechanisms may be used to activate the harvester.

Reference is made to FIG. 14 which schematically illustrates another possible way to activate the harvester described in FIG. 9. Here electromagnetic unit (33) is connected on base (31) that is connected to tire (500) and magnet (40) is mounted on frame (401) that may slide on base (31). The bending to movement converter (1024) comprises arm (402) that is connected to frame (401) and to support (403) through hinges (404) and (405), such that bending tire (500) moves frame 401 and magnet (44) relative to electromagnetic unit (33).

Reference is made to FIG. 15 which schematically illustrates another possible way to activate the harvester described in FIGS. 10 and 11. In FIG. 15 the electromagnetic device (70) is mounted on plate 402 that is connected to tire (500). The bending to movement converter comprises arm (501) that is connected to support (502) through hinge (503). Additional hinge may be used to connect arm (501) to from (50). Support (502) is connected to tire (500) such that bending of tire (500) moves frame (50) with magnets (61) and (62) relative to the electromagnetic device (70) and between two states that reveres the polarity of the magnetic flux in the electromagnetic device.

Reference is made to FIG. 16 which schematically illustrates another possible way to activate the harvester described in FIGS. 12 and 13. Here, frame (100) that houses the electromagnetic unit (1100) as shown in FIG. 12, is connected to base (140) that is connected to tire (500). The bending to movement converter (1026) comprises arm (1303) is connected though hinge (1305) to support (1304) that is connected to tire (500) such that bending of tire (500) shifts magnet unit (130) with magnet (120) between the two states.

In embodiments shown in FIGS. 14 through 16 a support (403, 502 and 1304) was used to connect an arm (402, 501 and 1303) to tire (500). Such a support is not required in every applications. For example, in case of applying the harvesters on tire, the bending of the tire may allow connecting the arm directly to the tire without a support. I addition, in embodiments shown in FIGS. 14 through 16 the hinges are shown schematically. These hinges are designed to allow movement of arms (402, 501 and 1303) because of bending of tire (500) to allow proper functioning of the harvesters. It is also clear that in some cases more than one hinge is will be required.

It is understood that in some cases it is possible to use the tire itself instead of the parts in the harvester that are connected to the tire.

Other mechanisms may be designed to activate the Bending Energy Harvester described in this patent application. These designs may use different geometries comprising two parts where one part holds magnets and one part holds an electromagnetic devices such that the two parts are free to move one relative to the other for example by having a hinge connection between them such that when mounted on a tire, the bending of the tire move the two parts one relative to the other such that the magnets move relative to the electromagnetic device.

In addition, it is possible to include spring such that once a minimum bending is reached the spring is released and moves the magnet relative to the coil such that the polarity reversing of the flux is faster and thus dΦ/dt.

The Bending Energy Harvesters described in this patent application were shown such that in the initial state the bending arms are flat. It is clear that the initial state may be bent to fit the tire the harvester they are fixed to.

In one embodiment of this patent application a device for converting bends of a tire to electricity, is designed to be fixed to the tire. The device comprises an electromagnetic device that includes a coil and a core, a magnet and a converter that is designed to convert bending of the tire to a movement of the magnet relative to the electromagnetic device such that repeatedly impulses of electric power are generated by the coil.

In another embodiment of this patent application a device for converting bends of a tire to electricity, is designed to be fixed to the tire. The device comprises an electromagnetic device that includes a coil and a core with a first end and a second end, a frame that is designed to enclosed the electromagnetic device, a converter that is designed to convert bending of the tire to a movement of the fame, a first magnet that is designed to be fixed to a first side wall of the frame and a second magnet that is designed to be fixed to a second side wall of the frame, whereby a back and forth movement of the tire causes a back and forth movement of the frame from a first state in which the first magnet touch the core in its first end to a second state in which the second magnet touch the core in its second end, such that the magnetic flux in the core can repeatedly reversed such that repeatedly impulses of electric power are generated by the coil.

In another embodiment of this patent application a device for converting bends of a tire to electricity, is designed to be fixed to the tire. The device comprises an electromagnetic device that includes a coil and a core with a first end and a second end, a magnet with a first extension that is attached to a first side of the magnet and a second extension that is attached to a second side of the magnet, a converter that is designed to convert bending of the tire to a movement of the magnet, wherein the device can be in a first position in which the first extension connects the first side of the magnet to the second end of the core and in which the second side of the magnet is connected to the first end of the core through a medium; wherein the device can be in a second position in which the second extension connects the second side of the magnet to the second end of the core and in which the first side of the magnet is connected to the first end of the core through the medium; whereby a back and forth movement of the tire causes a back and forth movement of the magnet from the first position to the second position, such that the magnetic flux in the core can repeatedly reversed.

Reference is made to FIG. 17a which schematically illustrates another embodiment of an energy harvester (8) that may be used as a power source for devices inside a tire (500). In this embodiment a magnet (8003) is suspended by a bending spring (8004) that is fixed to tire (500) by anchor (8005). The magnet is located close to a core (8001) of a coil (8002) at distance (80013). General example of the coil and core is demonstrated in FIG. 9c. When the tire bends abruptly the magnet is forced to vibrate, and electricity is generated in the coil.

The rotation of a tire creates centrifugal force $F_c$, as illustrated in FIG. 17a. This cause the magnet to shift from its preferred working point relative to core (8001), which reflects a high-power conversion. It is possible to limit the magnet movement by adding additional spring at some distance illustrated in FIG. 17b by adding additional spring (8006) that is fixed to the anchor (8005). Spring (8006) becomes active only when spring (8004) is deflected by the centrifugal force a pre-determined distance. When spring (8004) vibrates due to impulse under constant bending due to a centrifugal force it elastically exchanges energy back and forth with spring (8006) that eventually is converted into electricity in coil (8002). It is possible to add several springs below spring (8006) that comes to play at different centrifugal forces. It also possible to add spring above spring (8004) as exemplified in FIG. 17c. In a similar way, these spring confines the vibration of spring (8004) by effectively stiffening it, as its vibration amplitude exceed a certain distance.

In FIG. 17d a different version of this configuration is demonstrated where two magnets (80031) and (80032) are used. The advantage of such configuration is that vibration of the magnets may generate larger change in magnetic flux compared to one magnet. In addition, the additional magnet may compensate the bending of spring (8004) as a result of centrifugal forces and therefore may increase the working window of the harvester. It is noted that any configuration of magnets may be used that enhances the change of the magnetic flux in the core as the magnets move. For example, the gaps between the magnets may modulated. the polarity may be reversed, and ferromagnetic shield may be used such that the magnetic flux in the core is shaped to result in high change of its value as the magnets move.

In is noted that there is high pressure inside a tire. In a vehicle tire, the pressure typically ranges from 35 psi in small vehicle up to as high as 100 psi in trucks tire. At 35 psi the air density is 3 times higher than that in atmospheric pressure while at 100 psi the air density is 8 time that in atmospheric pressure. High pressure increases the viscosity of air and therefor the viscose damping. Reference is made to FIG. 17e. In this embodiment spring 8006 may be replaced by magnet 8006-1. The advantage of using a magnet instead of spring comes to play at high velocities where the centrifugal force is high and spring 8004 bends towards spring 8006. When the two springs are close to each other at high viscosity environment squeeze film effect damping converts part of the energy into heat and therefore reduces the energy that is converted into electricity. In a similar way in FIG. 17f magnets 80041-1 and 80041-2 replace springs 80041, 80041 shown in FIG. 17c.

It is also noted that an energy harvester may be sealed in low pressure chamber in order to reduce the loss of energy to viscose effects.

Yet another option is to suspend the coil and core to a spring (8008) and a damper (8009) as illustrated in FIG. 17g. This embodiment creates two spring-mass systems: The system that comprises spring (8004) and magnet (8003), and the system that comprises spring (8008) and coil (8002) and core (8001). The two spring-mass systems are designed such the deflection at the core and at the magnet upon centrifugal force is the same. This is achieved when $k_1/m_1 = k_2/m_2$, where $k_1$ is the spring constant of spring (8004), $m_1$ is the mass of the magnet (8003), $k_2$ is the spring constant of spring (8008) and $m_2$ is the mass of the coil (8002) and core (8001). In this case the relative position of the magnet and the core doesn't change significantly. When the harvester (8) experience an abrupt shock, such that when the tire meets the ground at the harvester location, an impact is generated on the two systems. Damper (8009) is designed such that the coil will not move significantly before the tire exits the flat part of the tire and therefore a relative movement will be generated by the vibration of the magnet relative to the core. FIG. 17h illustrates one possible configuration of damper (8009). As noted, the pressure inside a tyre is high and the air is much denser than the air in atmospheric pressure. Therefore, the damper may comprise a piston (80092) with few holes (80091) such that air movement inside the holes damps the movement of spring (8008).

Figure 17J:
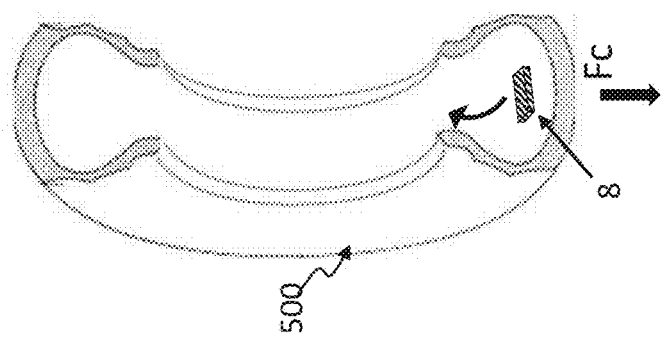
Figure 17I:
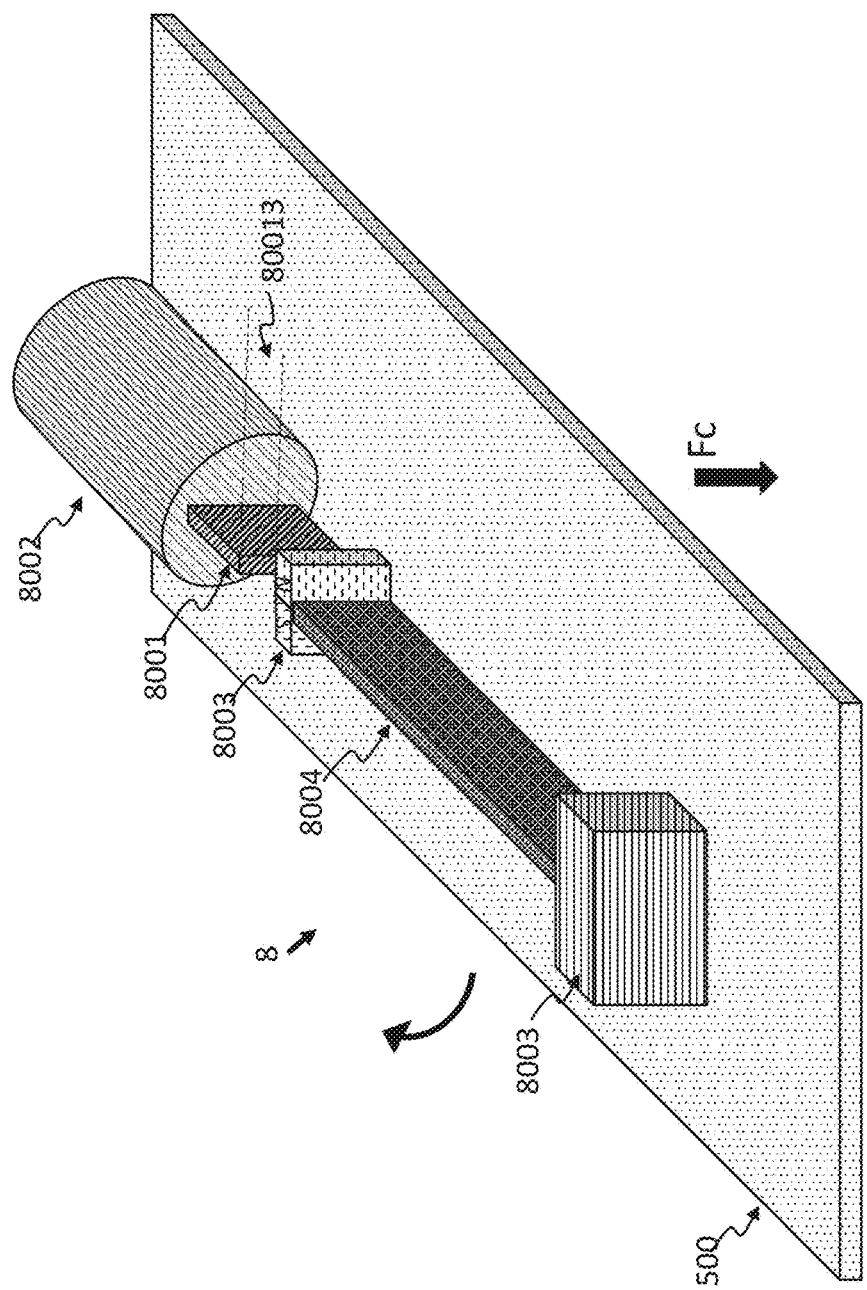

Reference is made to FIG. 17i and FIG. 17j which schematically illustrates another embodiment of an energy harvester (8) that may be used as a power source for devices inside a tire (500). This embodiment is similar to embodiment described in FIG. 17a except spring (8004) is rotated by 90° such that it is free to vibrate in the plane of the tire. When the tire bends abruptly the magnet is forced to vibrate, and electricity is generated in the coil. The advantage of such geometry is that spring (8004) is stiff in the direction of the centrifugal force and therefore the working point is hardly affected.

It is noted that the harvested power in Energy Harvester (8) depends on the gap (80013) between the core (8001) and the magnet, (either magnet (8003) or magnets (80031) and (80032)). The smaller gap (80013) is, the higher the harvested power as a result of the magnet movement. Yet, for a small gap and low vehicle velocity, the generated impulses may be too small to overcome the force between the magnet and the core and to allow the magnet to vibrate. In fact, at rest and depending on the spring constant of spring (8004), the spring may bend such that one of the magnets poles is closer to the core such that a small impact may not overcome the electromagnetic force. It is therefore preferable to have gap (80013) vary depending on the vehicle speed such that at high speed and high vibration amplitudes gap (80013) may be closer than it is at lower vibration amplitudes.

Figure 17L:
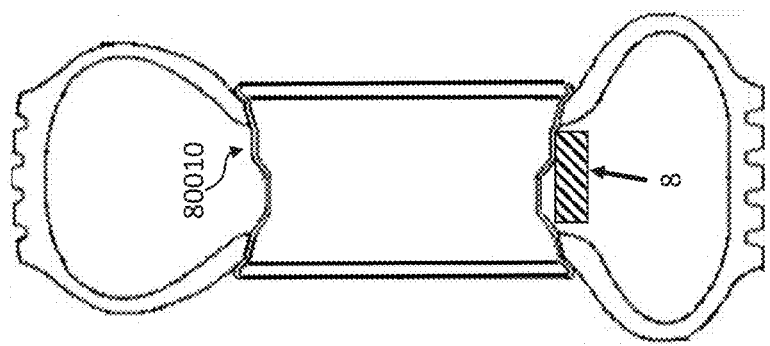
Figure 17K:
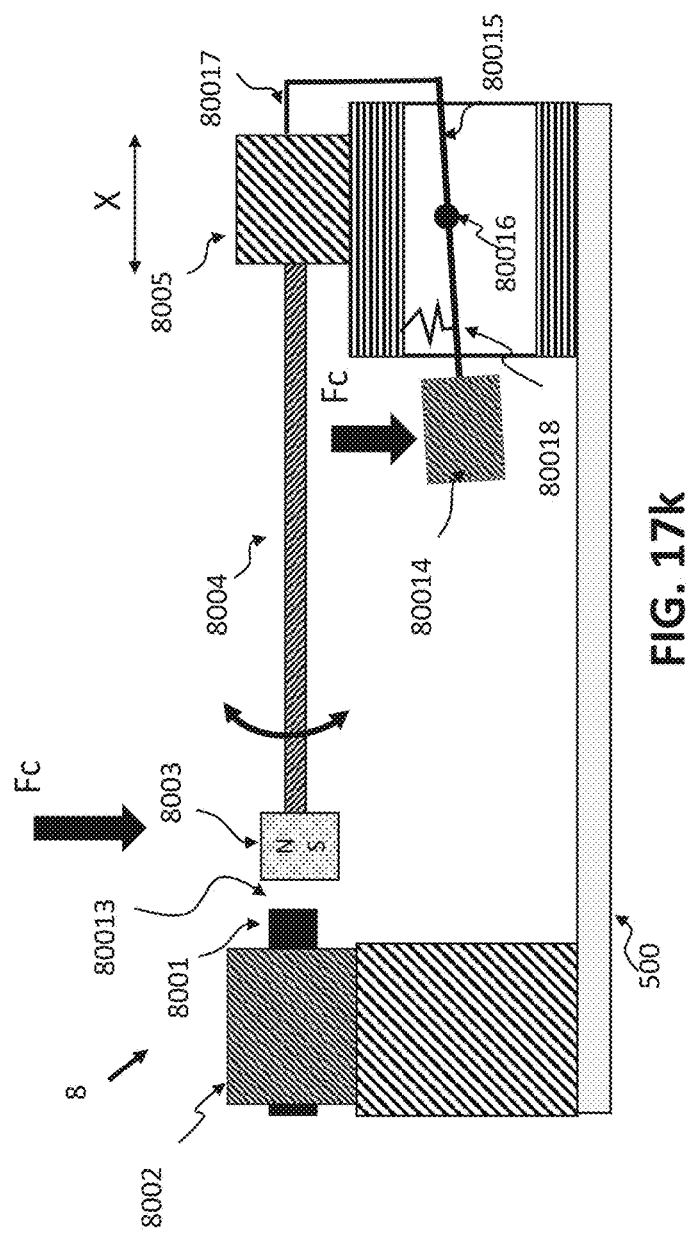

FIG. 17k demonstrates one way to control the gap (80013) as a function of the vehicle speed. In this embodiment the centrifugal force is used to pull mass (80014) that is fixed to a bar (80015) that is suspended on a hinge (80016). A lever (80017) is connected to the spring support (8005) that is free to slide in the X direction. As the speed of the vehicle increase, mass (80014) is pushed down and spring holder (8005) is pushed in the X direction such as gap (80013) decreases. As the vehicle velocity decrease mass (80014) returns and spring holder (8005) slides back with aid of spring (80018) such that gap (80013) increases.

It is noted that Energy harvester (8) may be placed on the tire rim (80010) as shown in FIG. 17L where it may generate electricity from tire rim vibrations and shocks.

It is also noted that an Energy harvester may be a combination of different embodiment described in this patent application. For example, it may use combination of the spring described in FIGS. 17a through 17d with magnets described in FIGS. 17e and 17f. In addition, it is noted that spring described in this patent application are drown just to exemplified a spring and a spring may have different shapes, different cross sections along it, and may be bent in any direction.

Figure 18:
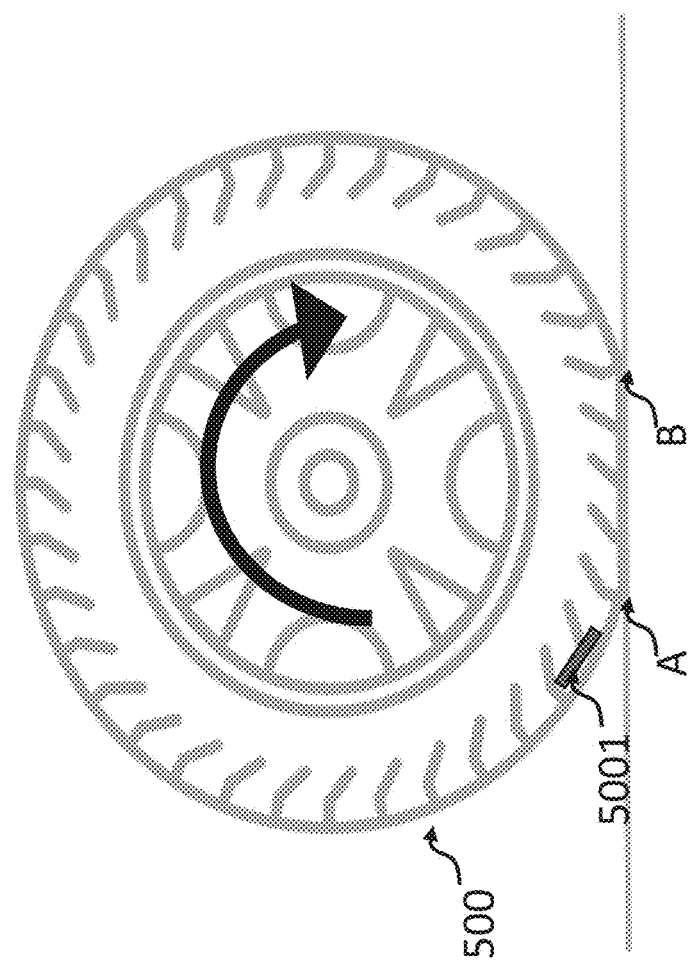
FIG. 18—Embodiment of electromagnetic energy harvester for harvesting power from tire bending
FIG. 19—Embodiments of electromagnetic energy harvester for harvesting power from tire bending
FIGS. 20a-20c—Embodiments of electromagnetic energy harvester for harvesting power from tire bending

Reference is made to FIG. 18 that exemplifies the use of Energy Harvesters (5001) for harvesting power from tire (500). The harvester may be attached to the inside of a tire or imbedded inside the tire and generate electricity as a result of random bending of the tire. In one embodiment as exemplified in FIG. 9, the bending result in movement of the magnet relative to coil. In another embodiment as exemplified in FIGS. 10 through 16, the power is generated when the harvester toggle between two states as a result of the tire bending. In another embodiment as exemplified in FIG. 17, an abrupt bendings of the tire causes a magnet to vibrate relative to a coil-core system.

Figure 19:
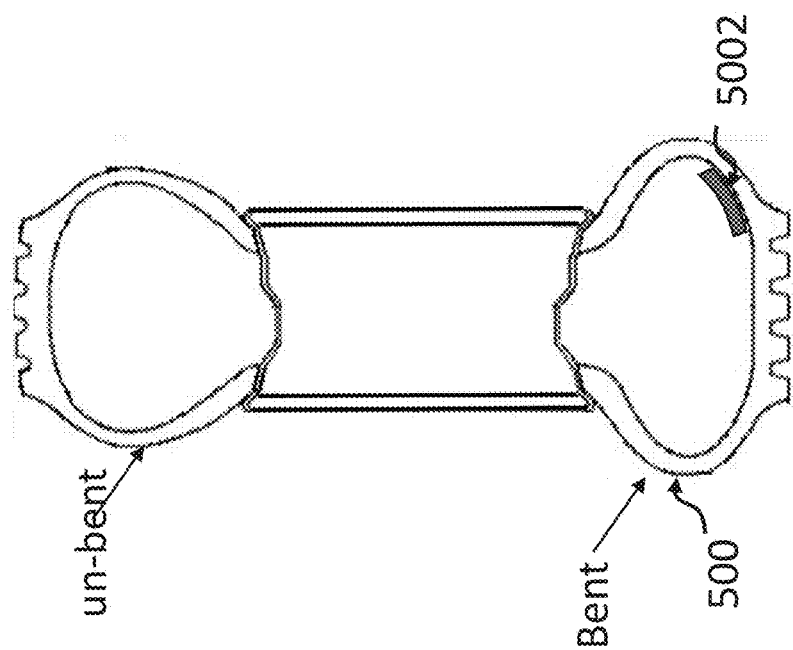

The contact of the tire is characterized by a flat section and therefore the bending takes place at point 'a' and point 'b' shown in FIG. 18. An energy harvester may also be placed vertically as shown in FIG. 19. These bending are relatively known, and a mechanical device may be designed to generated movement or vibration of a magnet relative to the coil as well as toggling between states such that each toggling steps reverses the flux polarity.

It is noted that the energy harvesting process of the different harvester configurations described in FIG. 17 takes place when the harvester exits the contact with the ground (Point B in FIG. 18), at which point the spring suspended magnet starts to vibrate because of the energy stored in the spring. The free vibration of the spring-magnet system may take place until the next revolution of the tire and therefore the free vibration of the magnet may be harvested by converting it to electricity throughout most of the rotation of the tire. It is noted that the purpose of the fixed magnet is only to compensate for the centrifugal force. This is an advantage over the electromagnetic energy harvester described in FIG. 8 where the centrifugal is the source of the harvested energy. The energy harvester described in FIG. 8 takes place only during the time where the harvester is in the flat part of the tire (between point A and B in FIG. 18), where the centrifugal force is canceled and the free magnet is rejected by the fixed magnet. Once the harvester exits the flat area, it is immediately pulled back towards the fixed magnet with very little radial oscillation. As explained above the faster the wheel rotation the smaller the time the free magnet is in the flat area and experiences the rejecting force applied by the fixed magnet. In addition, as experiment shows, as soon as the fixed magnet exits the flat part of the tire the centrifugal force pushes it towards the fixed magnet with no significant magnet oscillations that otherwise could contribute to the harvested energy.

A reference is made to embodiments described in FIGS. 20A-20C. FIG. 20A shows a front cross section of a wheel (55) and FIG. 19B is a side view of the wheel (55) that includes a rim with an inner side (200) and a tire with an inner side (99). The harvester for converting bends of the tire to electricity (5003) may be placed on the inner side of the rim (200), or to the inner side (99) of the tire (500). It is possible to use an extension arm (141) that extends from the harvester, for example arm (402) in FIG. 14, or arm (501) in FIG. 15, or arm (1303) in FIG. 16, in a way that it touches, lean or is simply close to the inner side of the tire such that when the tire bends then the extension are moves or bends such that it induces movement in the energy harvester according to any embodiment described in this patent application.

A reference is made to embodiment described in FIG. 20C that shows a cross section of the wheel (55). In this embodiment the energy harvester (5004) is placed on the inner side of the rim (200). The extension arm (141) extends from the energy harvester touches, lean or is close to the side of the tire such that when the tire bends the extension moves or bends such that it induces movement in the energy harvester according to any embodiment described in this patent application. The Energy Harvester described in FIG. 20C is shown in two states. In the upper position the tire is unbent, and the extension arm is in a loose state. In the bottom position the tire is bent, and the extension arm is at its second state: bending state. alternating from one state to the other state activates the energy harvester as described in different embodiments in this patent application.

The extension arms as depicted in FIGS. 20A-20C is shown only as a demonstration. The arm can be made of metal or any flexible material such as rubber or a material that can be compressed, as long as it is stiff enough to create the required movement in the harvester.

The present invention is related to a system for monitoring condition of a vehicle wheel tire, comprising a module that is designed to be positioned inside the wheel wherein the module comprises at least one sensor, a module processor, a module transmitter, and a power management circuit. The system also comprise an electromagnetic energy harvester that comprise a coil winded on a core and at least one magnet suspended on a spring and at close distance to the core such that the tire impacts causes the magnet to vibrate and to generate electric power in the coil that is managed by the power management circuit and is then used to power sensor, module processor and module transmitter.

The system may include an energy storage device and a charging circuit such that the managed power charges the energy storage device that is used to powers the sensor, module processor and module transmitter.

The system may include a primary battery and a capacitor wherein the managed power charges the capacitor, and wherein the sensor is designed to be powered selectively either by the capacitor or by the primary battery according to charging scheme controlled by the module processor.

The system may include a mechanism that controls the distance between the magnet and the core may such that the distance is smaller as the wheel rotation rate increase.

The system may include a mechanism that compensate for the displacement of the magnet that is induced by a centrifugal force that is generated in a tire during the tire rotates.

The system may include at least one attenuating spring that attenuate the deflection of the spring that supports the magnet wherein the deflection is induced by the centrifugal force that is generated in a tire when the tire rotates.

The system may including magnet fixed relative to the harvester body such that the magnetic force applied by the fixed magnet on the magnet that is suspended on a spring, is in opposite direction to the direction of a centrifugal force that is generated in a tire during the tire rotates.

The system may include a chamber that incapsulates the energy harvester at controlled pressure.

The system described in this invention uses an energy harvester for converting mechanical energy in a tire to electricity. This system and energy harvester can be used in many situations and for many components. For example, it can be used inside a wheel of a vehicle. The term vehicle hereinafter and in the claims refers to any kind of a transport machine that has at least one wheel that includes a rim and a tire, such as, cars, trucks, buses, tractors, bicycles, wagons, and the like.

The present invention also relates to the wheel of a vehicle that includes a rim, a tire and the device for converting bends of a tire to electricity. It is known that the part of the tire that is in contact with the ground at any given moment bends relatively to other parts of the tire. Therefore, we may fix the energy harvester descried in this invention to the inner side of the rim or to the inner side of the tire and use an arm to connect between the energy harvester and the tire in order to convey bending of the tire to the harvester. The conveyed movement activates the harvester either by toggling of a magnet between two states or by moving a magnet relative to a core of a coil or by vibrating a spring suspended magnet relative to a core of a coil.

What is claimed is:

1. A system for detecting pressure and wear conditions of at least a first vehicle wheel tire and a second vehicle wheel tire, comprising:
    a first module that is designed to be positioned inside the first wheel and a second module that is designed to be positioned inside the second wheel, wherein each one of said modules comprises sensors, a module processor, a module transmitter, and a power source for powering said sensors, module processor and module transmitter;
    a remote receiver and a data processor that are designed to be positioned outside said wheels;
    wherein the module processor of each wheel is designed to receive output from the sensors of said wheel;
    wherein the module transmitters of said first module and of said second module are designed to transmit to the remote receiver processed data from the module processors based on said output;
    wherein said data processor is designed to analyze the received processed data from said modules, to compare the processed data from the first wheel with the processed data from the second wheel, to compare the proceeded data from said modules with pre calculated data, and to provide alert based on said analysis and comparisons.

2. The system for detecting pressure and wear conditions or at least first vehicle wheel tire and a second vehicle wheel tire according to claim 1, wherein said sensors include a pressure sensor and at least one sensor from a group or sensors that includes, volume temperature sensor, tire material temperature sensor, vibration sensor, tire tread thickness sensor, and tire dryness sensor.

3. The system for detecting pressure and wear conditions of at least first vehicle wheel tire and a second vehicle wheel tire according to claim 1, wherein said power source is a primary battery.

4. The system for detecting pressure and wear conditions of at least first vehicle wheel tire and a second vehicle wheel tire according to claim 1, wherein said power source includes an energy harvester, a power management circuit, and an energy storage device, wherein the energy harvester is designed to harvest energy from rotations of said wheel and wherein said energy is managed by the power management circuit to result in a regulated power that charges the energy storage device.

5. The system for detecting pressure and wear conditions of at least first vehicle wheel tire and a second vehicle wheel tire according to claim 1, wherein said power source includes a primary battery, and an energy harvester, a capacitor and a power management circuit, wherein said energy harvester is designed to harvest energy from rotations of said wheel, wherein said energy is managed by the power management circuit to result in a regulated power that charges the capacitor, and wherein at least one of said sensors is designed to be powered selectively either by the capacitor or by the primary battery according to charging scheme controlled by the module processor.

6. The system for detecting pressure and wear conditions of at least first vehicle wheel tire and a second vehicle wheel tire according to claim 4, wherein said energy harvester includes a coil, a core and at least one magnet and is designed to be fixed to the tire, said energy harvester is designed to convert bending of the tire to electricity.

7. The system for detecting pressure and wear conditions of at least first vehicle wheel tire and a second vehicle wheel tire according to claim 5, wherein said energy harvester includes a coil, a core and at least one magnet and is designed to be fixed to the tire, said energy harvester is designed to convert bending of the tire to electricity.

8. The system for detecting pressure and wear conditions of at least first vehicle wheel tire and a second vehicle wheel tire according to claim 4, wherein said energy harvester includes a coil, a core and at least one magnet and is designed to be fixed to the rim of a wheel, said energy harvester is designed to convert vibrations and impacts to electricity.

9. The system for detecting pressure and wear conditions of at least first vehicle wheel tire and a second vehicle wheel tire according to claim 5, wherein said energy harvester includes a coil, a core and at least one magnet and is designed to be fixed to the rim of a wheel, said energy harvester is designed to convert vibrations and impacts to electricity.

10. The system for detecting pressure and wear conditions of at least first vehicle wheel tire and a second vehicle wheel tire according to claim 4, wherein said energy harvester is kind of a piezoelectric energy harvester that is designed to be fixed to the tire.

11. The system for detecting pressure and wear conditions of at least first vehicle wheel tire and a second vehicle wheel tire according to claim 5, wherein said energy harvester is kind of a piezoelectric energy harvester that is designed to be fixed to the tire.

12. The system for detecting pressure and wear conditions of at least first vehicle wheel tire and a second vehicle wheel tire according to claim 4, wherein said energy harvester is kind of a piezoelectric energy harvester that is designed to be fixed to the rim of a wheel, said energy harvester is designed to convert vibrations and impacts to electricity.

13. The system for detecting pressure and wear conditions of at least first vehicle wheel tire and a second vehicle wheel tire according to claim 5, wherein said energy harvester is kind of a piezoelectric energy harvester that is designed to be fixed to the rim of a wheel, said energy harvester is designed to convert vibrations and impacts to electricity.

14. The system for detecting pressure and wear conditions of at least first vehicle wheel tire and a second vehicle wheel tire according to claim 1, wherein said alert includes information about technical service that said tires need.

15. The system for detecting pressure and wear conditions of at least first vehicle wheel tire and a second vehicle wheel tire according to claim 1, wherein at least one of said sensors is designed to receive energy from said power source and by that to be active when the tire rotation speed exceeds a preset speed.

16. A system for monitoring condition of a vehicle wheel tire, comprising:
a module that is designed to be positioned inside the wheel wherein said module comprises at least one sensor, a module processor, a module transmitter, a power management circuit and an electromagnetic energy harvester comprising a coil winded on a core and at least one magnet suspended on a spring and at close distance to the core such that the tire impacts causes the magnet to vibrate and to generate electric power in the coil such that the electric power is managed by the power management circuit and such that the managed power is used to power said at least one sensor, module processor and module transmitter.

17. The system for monitoring condition of a vehicle wheel tire according to claim 16, further includes an energy storage device and a charging circuit such that said managed power is designed to charge the energy storage device and such that the energy storage device is designed to power said at least one sensor, module processor and module transmitter.

18. The system for monitoring condition of a vehicle wheel tire according to claim 16, further includes a primary battery and a capacitor wherein said managed power is designed to charge the capacitor, and wherein at least one of said at least one sensor is designed to be powered selectively either by the capacitor or by the primary battery according to charging scheme controlled by said module processor.

19. The system for monitoring condition of a vehicle wheel tire according to claim 16, wherein said distance, is designed to change with the vehicle velocity such that said distance is smaller as said wheel rotation rate increase.

20. The system for monitoring condition of a vehicle wheel tire according to claim 16, further includes a mechanism that is designed to compensate for the displacement of the said magnet wherein the displacement is induced by a centrifugal force that is generated during said wheel rotation.

21. The system for monitoring condition of a vehicle wheel tire according to claim 16, further including at least one limiting spring that is designed to limit the deflection of said magnet suspended on a spring.

22. The system for monitoring condition of a vehicle wheel tire according to claim 16, further includes at least one magnet fixed relative to said harvester and is designed to limit the deflection of said one magnet suspended on a spring.

23. The system for monitoring condition of a vehicle wheel tire according to claim 16, further includes a chamber that incapsulates said energy harvester at controlled pressure.

* * * * *